(12) United States Patent
Yamaguchi et al.

(10) Patent No.: US 7,834,898 B2
(45) Date of Patent: Nov. 16, 2010

(54) IMAGE FORMING DEVICE, IMAGE FORMING METHOD, AND EXPOSURE HEAD

(75) Inventors: Kenji Yamaguchi, Matsumoto (JP); Nozomu Inoue, Matsumoto (JP); Yujiro Nomura, Shiojiri (JP); Ken Ikuma, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 111 days.

(21) Appl. No.: 12/188,034

(22) Filed: Aug. 7, 2008

(65) Prior Publication Data

US 2009/0041503 A1   Feb. 12, 2009

(30) Foreign Application Priority Data

Aug. 7, 2007 (JP) ............................. 2007-204899
Jul. 4, 2008 (JP) ............................. 2008-175397

(51) Int. Cl.
*B41J 2/435* (2006.01)
*B41J 2/47* (2006.01)

(52) U.S. Cl. ....................................... 347/234; 347/248

(58) Field of Classification Search ................. 347/230, 347/233, 238, 241, 244, 256, 258, 229, 234, 347/248

See application file for complete search history.

(56) References Cited

U.S. PATENT DOCUMENTS

| 6,188,086 | B1* | 2/2001 | Masuda et al. ................. 257/98 |
| 6,456,313 | B1* | 9/2002 | Hiyoshi ....................... 347/238 |
| 7,443,412 | B2* | 10/2008 | Seo ............................. 347/238 |
| 2009/0041504 | A1* | 2/2009 | Yamaguchi et al. ......... 399/220 |

FOREIGN PATENT DOCUMENTS

JP    2868175    12/1998

* cited by examiner

*Primary Examiner*—Hai C Pham
(74) *Attorney, Agent, or Firm*—DLA Piper LLP (US)

(57) ABSTRACT

An image forming device includes a photoconductor drum having a rotational shaft in a first direction, and an exposure head having a plurality of imaging optical systems disposed in the first direction and a second direction and each having a negative optical magnification, and a light emitting element substrate on which a plurality of light emitting elements are disposed, the plurality of light emitting elements emitting light beams imaged on the photoconductor drum by one of the imaging optical systems, and the light beams are imaged by the imaging optical systems disposed in the second direction on the photoconductive drum at positions different from each other in the second direction.

8 Claims, 23 Drawing Sheets

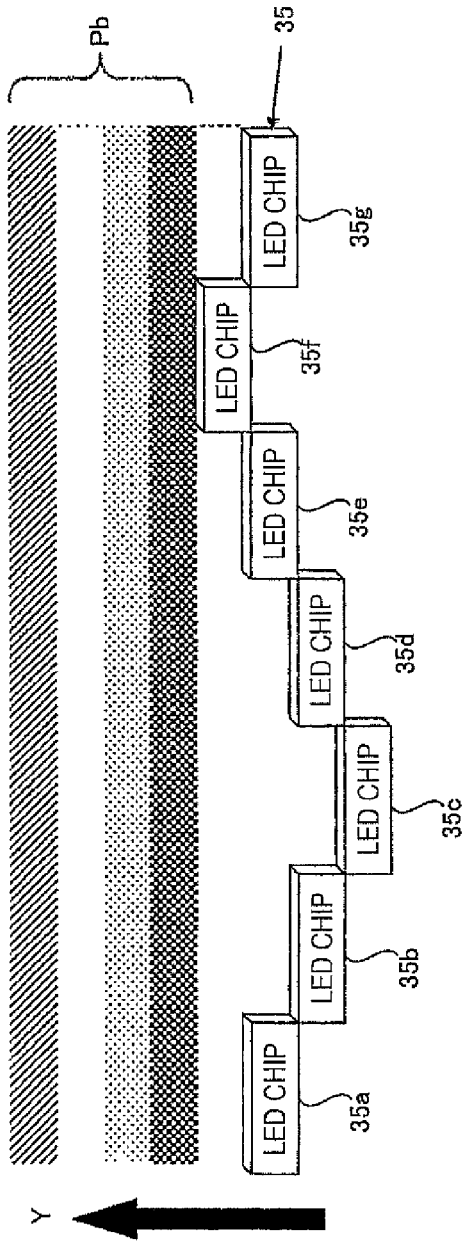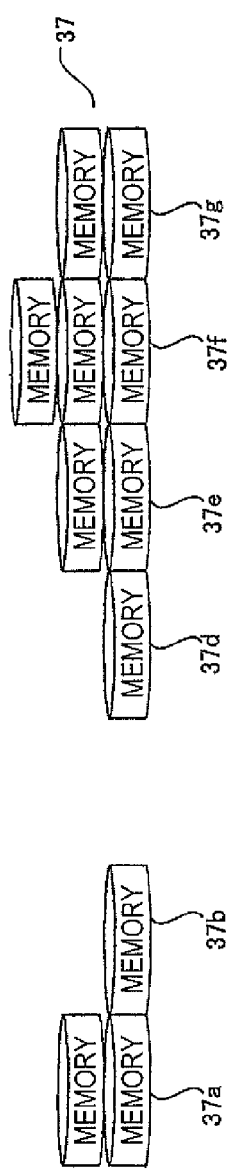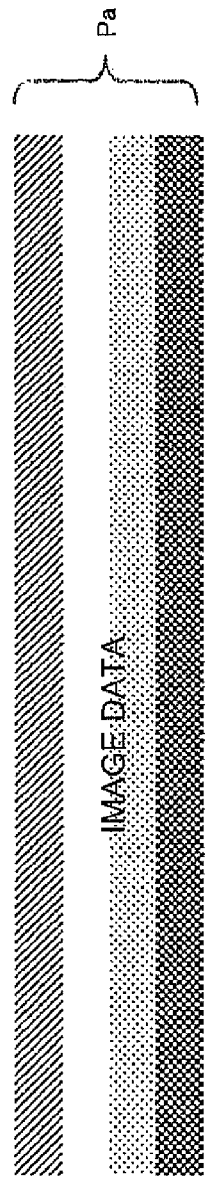

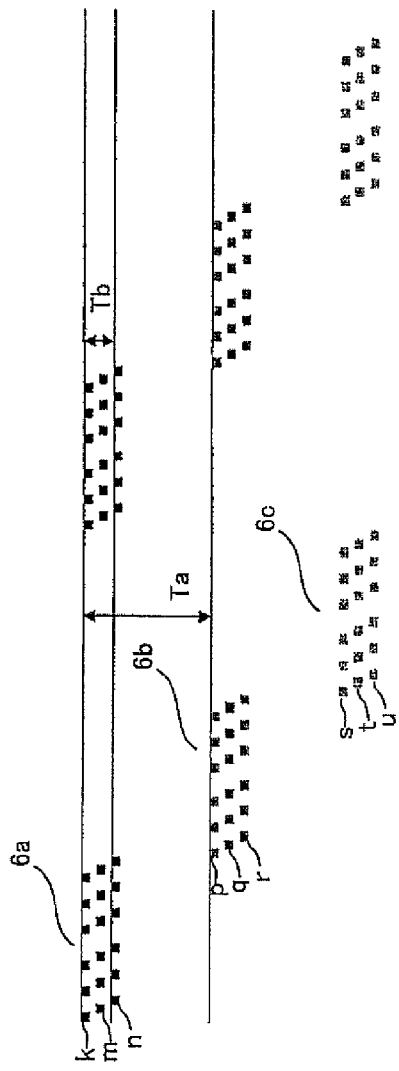
FIG.13
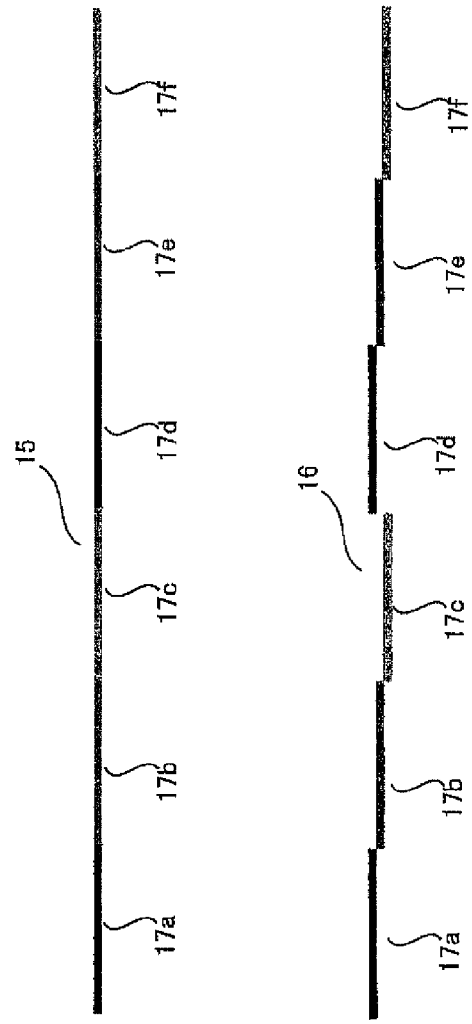
FIG.14
FIG.15

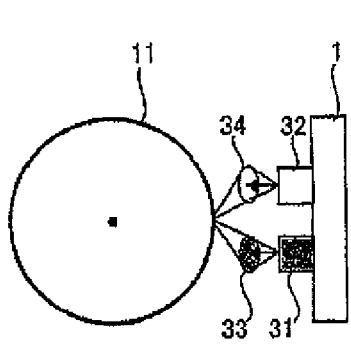
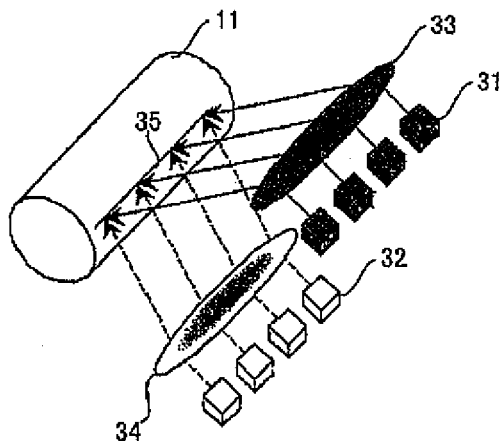
FIG.17A
Prior Art
FIG.17B
Prior Art
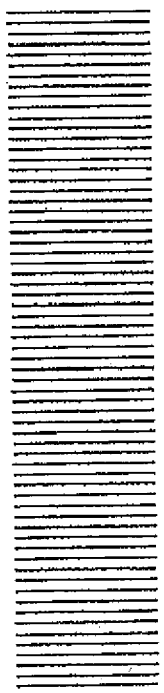
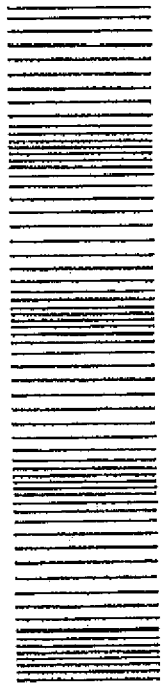
FIG.18A
Prior Art
FIG.18B
Prior Art

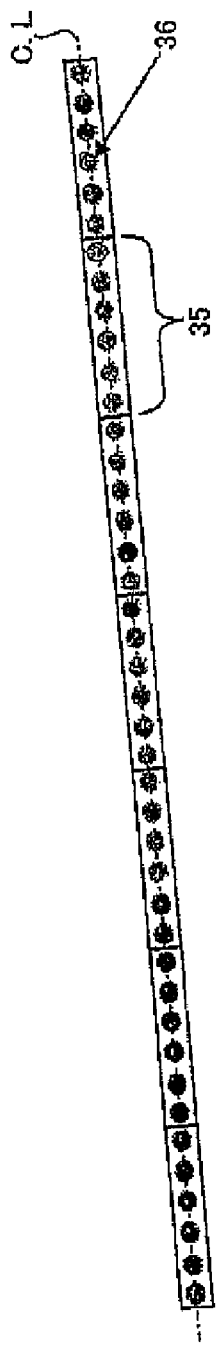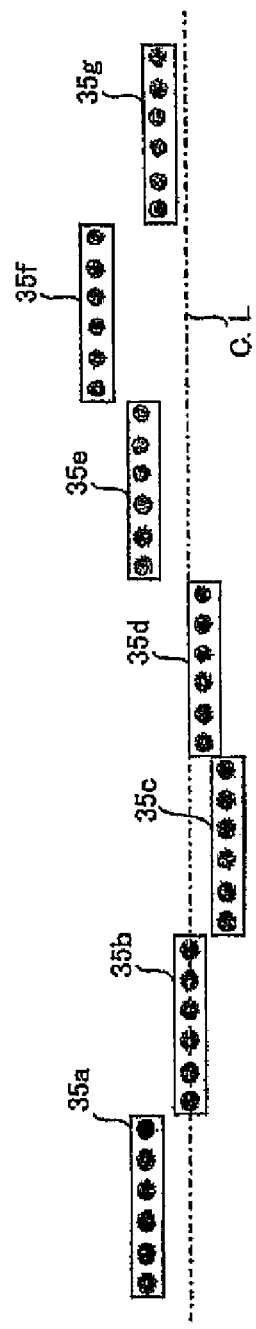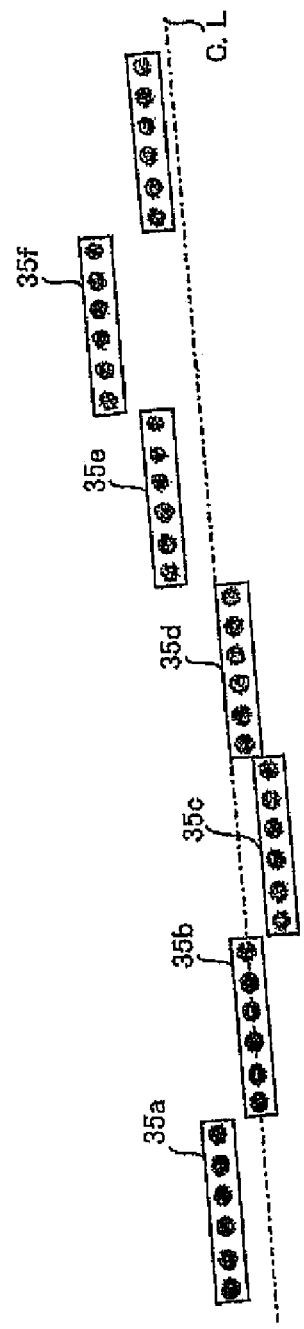
FIG.19A Prior Art
FIG.19B Prior Art
FIG.19C Prior Art

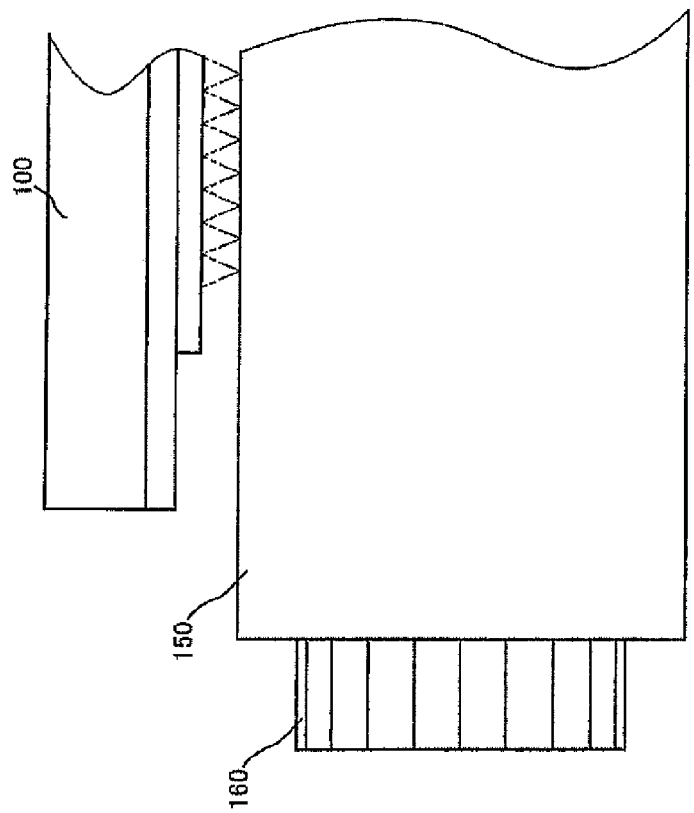
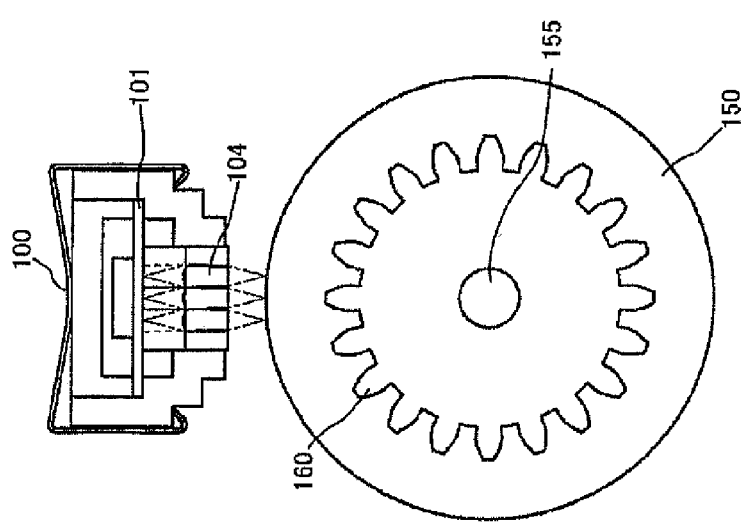
FIG.20A
FIG.20B

IMAGE FORMING DEVICE, IMAGE FORMING METHOD, AND EXPOSURE HEAD

CROSS-REFERENCE TO THE RELATED APPLICATIONS

This application claims the benefit of priority under 35 USC 119 of Japanese Patent Application No. 2007-204899 filed on Aug. 7, 2007 and Japanese Patent Application No. 2008-175397 filed on Jul. 4, 2008, the entire contents of both are incorporated herein by reference.

BACKGROUND

1. Technical Field

The present invention relates to an exposure head capable of suppressing deterioration of an image quality, an image forming device and an image forming method using the exposure head.

2. Related Art

As an exposure light source of an image forming device, there is known a device having a configuration of disposing a line head using LEDs. In Japanese Patent No. 2868175 (Document 1), there is proposed a technology for improving the resolution without decreasing the pitch of the arrangement of the light emitters in the light emitter array. FIGS. 17A and 17B are explanatory diagrams showing a schematic configuration of an image forming device using the line head disclosed in the Document 1. FIG. 17A is a diagram viewed in a direction perpendicular to a cross-sectional surface of a photoconductor 11, and FIG. 17B is a diagram viewed from a point obliquely above the photoconductor 11.

Light emitter arrays 31, 32 are arranged on a substrate 1 in n (n=2 in this example) lines, and monocular lenses 33, 34 are provided corresponding respectively to the light emitter arrays. The optical axes of the monocular lenses 33, 34 are disposed so as to be shifted from the directions towards the centers of the light beams emitted from the respective light emitter arrays 31, 32. By adopting such a configuration, the light beams from then lines of light emitter arrays can be imaged on the same line 35 of the photoconductor 11.

In the example described in the Document 1, banding is caused when the drive system of the photoconductor fluctuates (vibrates) around a predetermined printing speed or printing cycle. For example, in the case of driving with gears, velocity variation is caused in accordance with the gear pitch, which causes a striped image appearing on the image as the banding. Therefore, the problem of deterioration of the image quality has arisen. FIG. 18A shows an original image, and FIG. 18B shows the image formed on the imaging surface when the banding exists.

Further, when attaching the line head having the light emitting elements mounted thereon to the main body, the line head is sometimes fixed to the position shifted from the reference position. This condition is called skew resist misalignment, and causes deterioration of the image quality. FIG. 19A is an explanatory diagram of such skew resist misalignment. LED chips 35 each having a plurality of LED elements 36 mounted thereon are arranged linearly in an axial direction (main scanning direction) of the photoconductor to form a line head, and the line head is obliquely fixed to the main body with respect to the reference position. C.L denotes the center line of the substrate. The skew resist misalignment is also caused in the case of using organic EL elements as the light emitting elements.

Further, in the case in which LEDs are used as the light emitting elements mounted on the line head, there is caused the curvature resist misalignment in which the LED chips described above are attached to the substrate in a curved manner. FIG. 19B is an explanatory diagram of such curvature resist misalignment. Each of the LED chips 35a through 35g is mounted in a curved manner with respect to the center line C.L of the substrate except the LED chip 35b.

In the case of mounting the LED chips on the line head, the skew resist misalignment described above and the curvature resist misalignment occur in combination. FIG. 19C is an explanatory diagram of the case in which the skew resist misalignment and the curvature resist misalignment occur in combination. As described above, since the skew resist misalignment and the curvature resist misalignment are combined, there is caused a problem that a latent image misalignment (exposure misalignment) occurs on the photoconductor to deteriorate the image quality.

SUMMARY

In view of such a problem in the related art technology, the invention has an advantage of providing a line head capable of suppressing influence of the banding and correcting the latent image misalignment to improve the image quality, an image forming device and the image forming method using the line head.

An image forming device according to an aspect of the invention includes a photoconductor drum having a rotational shaft in a first direction, and an exposure head having a plurality of imaging optical systems disposed in the first direction and a second direction and each having a negative optical magnification, and a light emitting element substrate on which a plurality of light emitting elements are disposed, the plurality of light emitting elements emitting light beams imaged on the photoconductor drum by one of the imaging optical systems, and the light beams are imaged by the imaging optical systems disposed in the second direction on the photoconductive drum at positions different from each other in the second direction.

Further, according to another aspect of the invention, in the image forming device described above, the imaging optical systems disposed in the second direction image the light beams from the light emitting elements on the photoconductor drum at positions different from each other in the first direction.

Further, according to another aspect of the invention, in the image forming device described above, the imaging optical systems are disposed linearly in the first direction to form a plurality of imaging optical system lines.

Further, according to another aspect of the invention, in the image forming device described above, there are further provided a drive section that drives the photoconductor drum, and a gear having a pitch G, and for transmitting driving force from the drive section to the photoconductor drum, and the pitch G has a following relationship with a width Da between the plurality of imaging optical system lines.

$$Da > (1/2) \times G$$

Further, according to another aspect of the invention, in the image forming device described above, the gear is disposed to the rotational shaft of the photoconductor drum.

Further, according to another aspect of the invention, in the image forming device described above, the photoconductor drum has a flange, and the gear is fixed to the flange.

Further, according to another aspect of the invention, in the image forming device described above, there is further provided a connection section that connects the drive section and the photoconductor drum, and has a second rotational shaft, and the gear is disposed to the second rotational shaft.

Further, according to another aspect of the invention, in the image forming device described above, there is further provided a control section that makes light emitting timing of the light emitting elements different between the imaging optical system lines, thereby forming one of a linear and a substantially linear latent image in the first direction of the photoconductor drum.

Further, according to another aspect of the invention, in the image forming device described above, the imaging optical system is composed mainly of two or more of lenses.

Further, according to another aspect of the invention, in the image forming device described above, the light emitting element is formed of an organic EL light emitting element.

Further, an image forming method according to still another aspect of the invention includes the steps of providing a first imaging optical system line having a plurality of imaging optical systems each having a negative optical magnification disposed in a first direction, a second imaging optical system line having a plurality of imaging optical systems each having a negative optical magnification disposed in the first direction, and imaging light beams on photoconductor drum at positions different in a second direction from positions at which the first imaging optical system line images light beams, a plurality of light emitting elements for emitting light beams imaged by one of the imaging optical systems, and a photoconductor drum moving in the second direction, forming a latent image on the photoconductor drum while emitting the light beams imaged by the first imaging optical system line, moving the photoconductor drum for a predetermined period of time after the latent image has been formed with the first imaging optical system line, and forming a latent image on the photoconductor drum while emitting the light beams imaged by the second imaging optical system line after moving the photoconductor drum for a predetermined period of time.

Further, an exposure head according to still another aspect of the invention includes, a first imaging optical system line having a plurality of imaging optical systems each having a negative optical magnification disposed in a first direction, a second imaging optical system line having a plurality of imaging optical systems each having a negative optical magnification disposed in the first direction, and imaging light beams at positions different in a second direction from positions at which the first imaging optical system line images light beams, and a plurality of light emitting elements for emitting light beams imaged by one of the imaging optical systems.

Further, according to another aspect of the invention, in the exposure head described above, the plurality of light emitting elements for emitting the light beams imaged by one of the imaging optical systems is arranged in the first and the second directions.

According to the image forming device, the image forming method, and the exposure head described above, since the shading caused by banding is scattered in all directions in the image to be formed, it becomes possible to prevent the deterioration of the image quality caused by banding.

It should be confirmed that in relation to the above aspects of the invention, reference aspects as described below are also advantageous configurations. Specifically, the line head according to a reference aspect of the invention includes a substrate, a light emitter array having a light emitting group line formed by arranging a plurality of light emitting elements on the substrate along an axial direction (a main scanning direction) of a photoconductor, and an imaging lens array disposed corresponding to the light emitter array, and two or more of the light emitter arrays and the imaging lens arrays are disposed with respect to a moving direction (a sub-scanning direction) of the photoconductor, and a latent image is formed on the photoconductor at positions different between the lines.

Further, according to another reference aspect of the invention, in the line head described above, a line pitch of the latent image is formed longer than a half the gear pitch of a drive section of the photoconductor.

Further, according to another reference aspect of the invention, in the line head described above, the light emitter array has a plurality of light emitting element group lines with respect to the moving direction of the photoconductor.

Further, according to another reference aspect of the invention, in the line head described above, the light emitting elements of the light emitter array are separated into light emitting element groups corresponding respectively to the individual imaging lenses of the imaging lens array.

Further, according to another reference aspect of the invention, in the line head described above, the light emitting elements are formed of organic EL light emitting elements.

An image forming device according to still another reference aspect of the invention includes a charging section disposed around an image carrier, a line head according to any one of the reference aspects of the invention described above, a developing section, at least two image forming stations each provided with each of the image forming units with a transfer section, and the transfer medium passes through each of the image forming stations, thereby executing the image formation in a tandem manner.

Further, according to another reference aspect of the invention, in the image forming device described above, there is further provided with a control section for the line head, and the control section controls the light emitting operations of the light emitting elements differently between the light emitting element group lines, thereby preventing the position misalignment of the latent image from occurring.

Further, according to another reference aspect of the invention, in the image forming device described above, the control of the light emitting operations of the light emitting elements in a different manner between the light emitting element groups is a control based on one of delay data of the relative time to a reference operation, and the timing data of the absolute time, and there is further provided a storage section that stores one of the delay data and the timing data.

Further, according to another reference aspect of the invention, in the image forming device described above, the control section is provided to an external controller.

Further, according to another reference aspect of the invention, in the image forming device described above, the control section is provided to the line head.

An image forming method according to still another reference aspect of the invention includes obtaining correction data for correcting misalignment of the latent image forming position when the image formation is executed in a tandem manner providing at least two image forming stations for forming the latent image by the line head according to any one of the reference aspects of the invention, storing the correction data into the storage section, and controlling the light emitting operation of the light emitting elements differently between the light emitting element group lines disposed on the line head with the correction data retrieved from the storage section.

BRIEF DESCRIPTION OF THE DRAWINGS

The invention will now be described with reference to the accompanying drawings, wherein like numbers reference like elements.

FIG. 7 is an explanatory diagram showing an embodiment of the invention.

FIG. 13 is an explanatory diagram showing an example in which no exposure misalignment correction is executed.

FIG. 14 is an explanatory diagram showing an embodiment of the invention.

FIG. 15 is an explanatory diagram showing an embodiment of the invention.

FIGS. 17A and 17B are explanatory diagrams showing a related art example.

FIGS. 18A and 18B are explanatory diagrams showing a related art example.

FIGS. 19A through 19C are explanatory diagrams showing a related art example.

FIGS. 20A and 20B are explanatory diagrams showing another embodiment of the invention.

DESCRIPTION OF EXEMPLARY EMBODIMENTS

Figures 2A, 2B:
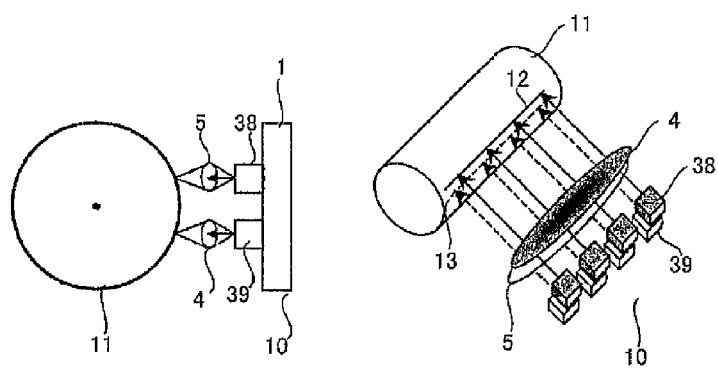
FIGS. 2A and 2B are explanatory diagrams showing an embodiment of the invention.

The invention will hereinafter be described with reference to the accompanying drawings. FIGS. 2A and 2B are explanatory diagrams showing an embodiment of the invention. FIG. 2A is a diagram viewed in a cross-sectional surface perpendicular to an axial direction of a photoconductor 11, and FIG. 2B is a diagram of the photoconductor 11 and a line head 10 viewed from a point obliquely above the photoconductor 11 and the line head 10.

The line head 10 has light emitter arrays 38, 39 arranged on a substrate 1 in two lines in the moving direction (the Y direction) of the photoconductor, each of the light emitter arrays 38, 39 being provided with a plurality of light emitting elements arranged in the axial direction (the main scanning direction) of the photoconductor 11.

The reference numerals 4, 5 each denote an imaging lens array formed of a microlens array (MLA) using microlenses with negative optical magnifications. The output light beams of the light emitting elements are transmitted through the imaging lens arrays 4, 5, and the latent images are formed on the photoconductor 11 at different positions 12, 13. It should be noted that SELFOC™ lens arrays (SLA) can be used as the imaging lens arrays 4, 5.

Figure 1:
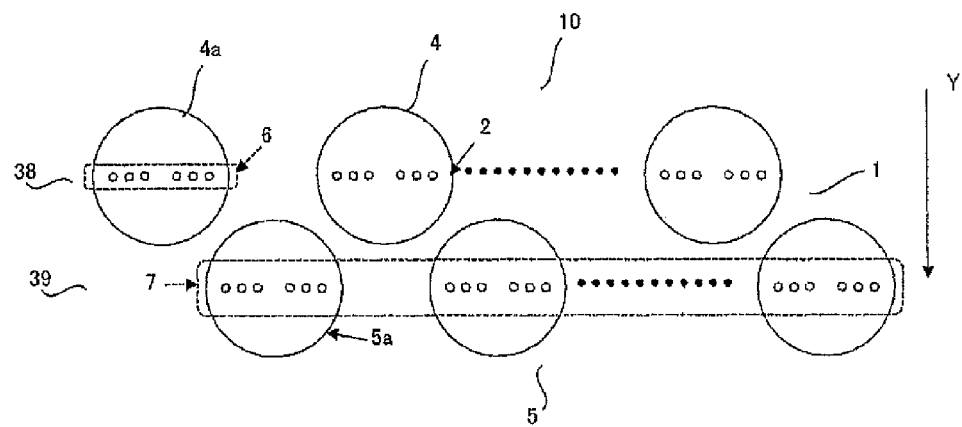
FIG. 1 is an explanatory diagram showing an embodiment of the invention.

FIG. 1 is an explanatory diagram showing the positional relationship between the light emitter arrays 38, 39 shown in FIGS. 2A and 2B and the imaging lens arrays 4, 5. In FIG. 1, on the substrate 1, there are disposed light emitting element group lines 7 each having a plurality of light emitting elements 2 arranged along the axial direction of the photoconductor (a latent image carrier) 11. These light emitting element group lines 7 correspond respectively to the light emitter arrays 38, 39. In the example shown in FIG. 1, the light emitter arrays 38, 39 are arranged in two lines with respect to the moving direction (the Y direction) of the photoconductor. It should be noted that the moving direction of the photoconductor can be assumed to be the direction (the sub-scanning direction) perpendicular to the axial direction of the photoconductor. The imaging lens arrays 4, 5 are arranged corresponding to the light emitter arrays 38, 39. Therefore, the imaging lens arrays 4, 5 are arranged in a plurality of lines in the moving direction of the photoconductor.

The individual imaging lenses 4a, 5a of the imaging lens arrays 4, 5 are made correspond respectively to the light emitting element groups 6 formed by grouping a plurality of light emitting elements 2 and partitioned from each other. Further, the light emitter array 39 as the light emitter group line 7 is made correspond to, for example, the imaging lens array 5. In other words, in the embodiment of the invention, a plurality of lines of imaging lens arrays is arranged with respect to the moving direction of the photoconductor, and the individual imaging lenses are made correspond respectively to the light emitting element groups. Further, the imaging lens array in one line along the axial direction of the photoconductor is made correspond to one of the light emitter group lines. It should be noted that in the example shown in FIGS. 1 and 2, organic EL elements are used as the light emitting elements 2.

Figure 3:
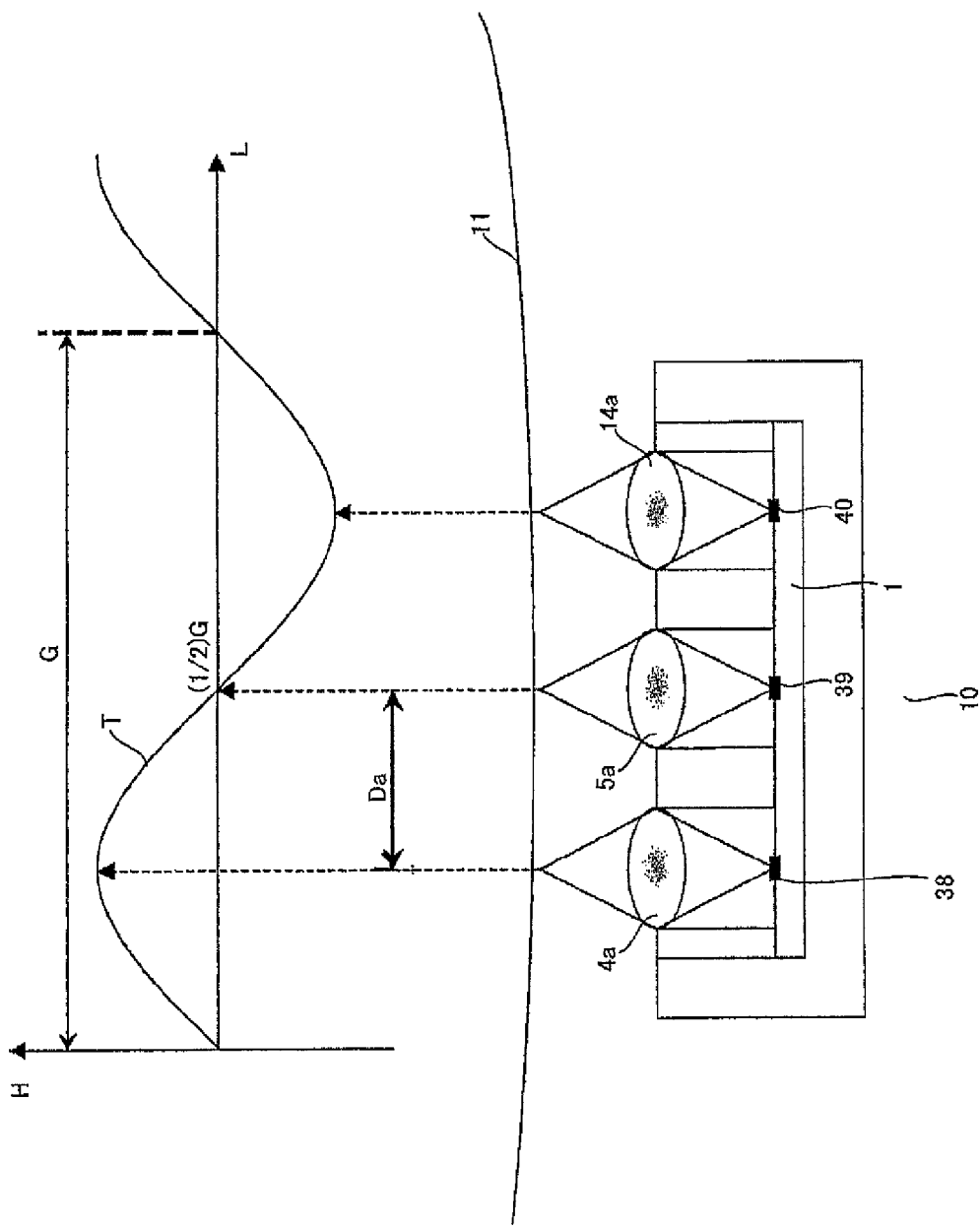
FIG. 3 is an explanatory diagram showing an embodiment of the invention.

FIG. 3 is an explanatory diagram showing the embodiment of the invention. In FIG. 3, the line head 10 has the light emitter arrays 38 through 40 arranged on the substrate 1 in the lines disposed along the axial direction of the photoconductor 11. The reference symbols 4a, 5a, and 14a are imaging lenses. The vertical axis H in the characteristic diagram represents the velocity variation of a drive device for driving the photoconductor 11 caused by the banding thereof, and the horizontal axis L thereof represents the distance in a direction perpendicular to the axial direction of the photoconductor 11. The velocity variation characteristic T on this occasion varies periodically with the gear pitch G of the drive device for driving the photoconductor 11 as a cycle.

As shown in FIGS. 2A and 2B, in the embodiment of the invention, the imaging positions in the rotational direction of the photoconductor are different between the lines of the lens arrays. Therefore, the latent image line formed on the photoconductor 11 in the axial direction (the main scanning direction) has a meandering shape. The pitch Da (the pitch in the sub-scanning direction) between the imaging lenses 4a, 5a corresponds to a pitch of the latent image lines formed on the photoconductor. By arranging the pitch Da to be longer than a half the gear pitch G of the drive device, the convex part and the concave part of the velocity variation characteristic T cancel each other, thus the influence of the banding can be made obscure.

Figures 4A, 4B, 4C, 4D, 4E:
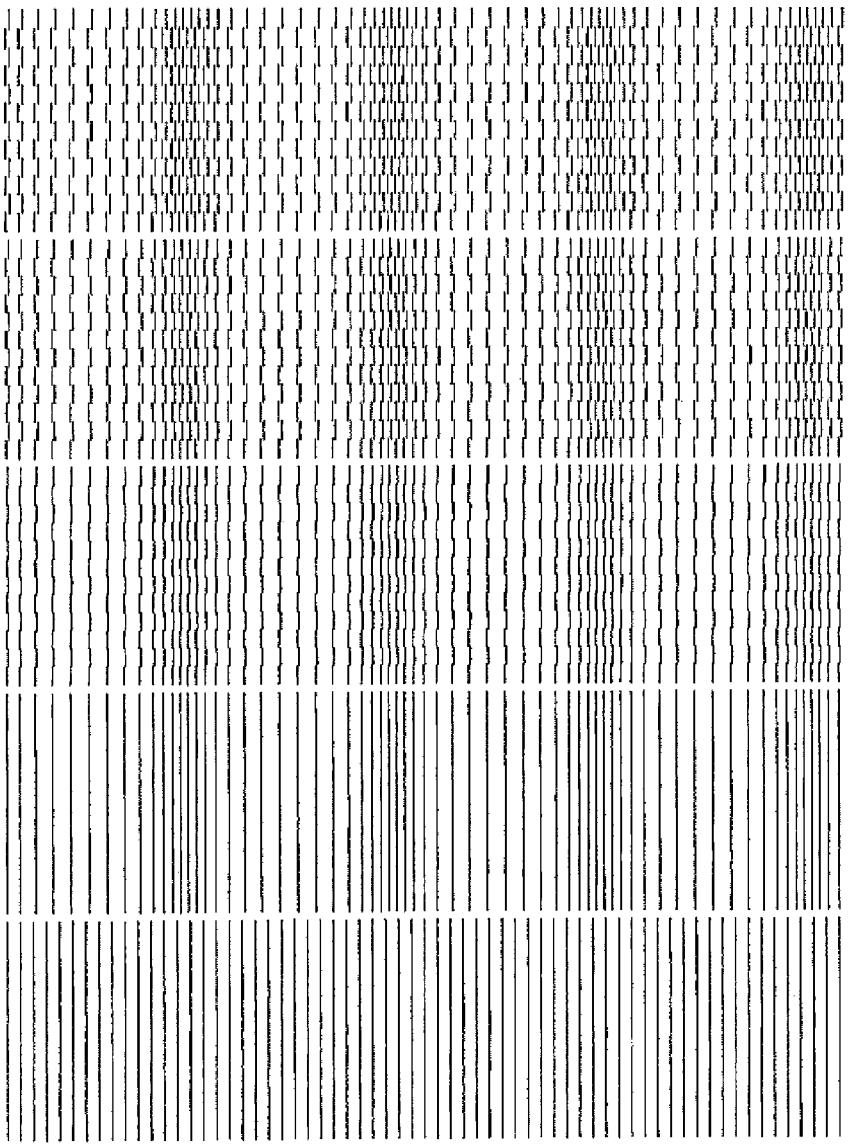
FIGS. 4A through 4E are explanatory diagrams showing an embodiment of the invention.

FIGS. 4A through 4E are explanatory diagrams showing examples of the latent image lines formed on the photoconductor. FIG. 4A shows an original image, FIG. 4B shows the latent image lines in the related art, FIGS. 4C through 4E are latent image lines according to the embodiment of the invention in the examples with the pitch Da between the imaging lenses in the sub-scanning direction different from each other. As described above, since the latent lines in the main scanning direction have the meandering shapes in the embodiment of the invention, the deterioration of the image quality caused by the banding can further be suppressed in comparison with the latent lines in the related art. It should be noted that the pitches (the line pitches of the latent image lines) in the sub-scanning direction between the imaging lenses are arranged in the samples to satisfy (the sample in FIG. 4C)<(the sample in FIG. 4D)<(the sample in FIG. 4E).

Figure 5:
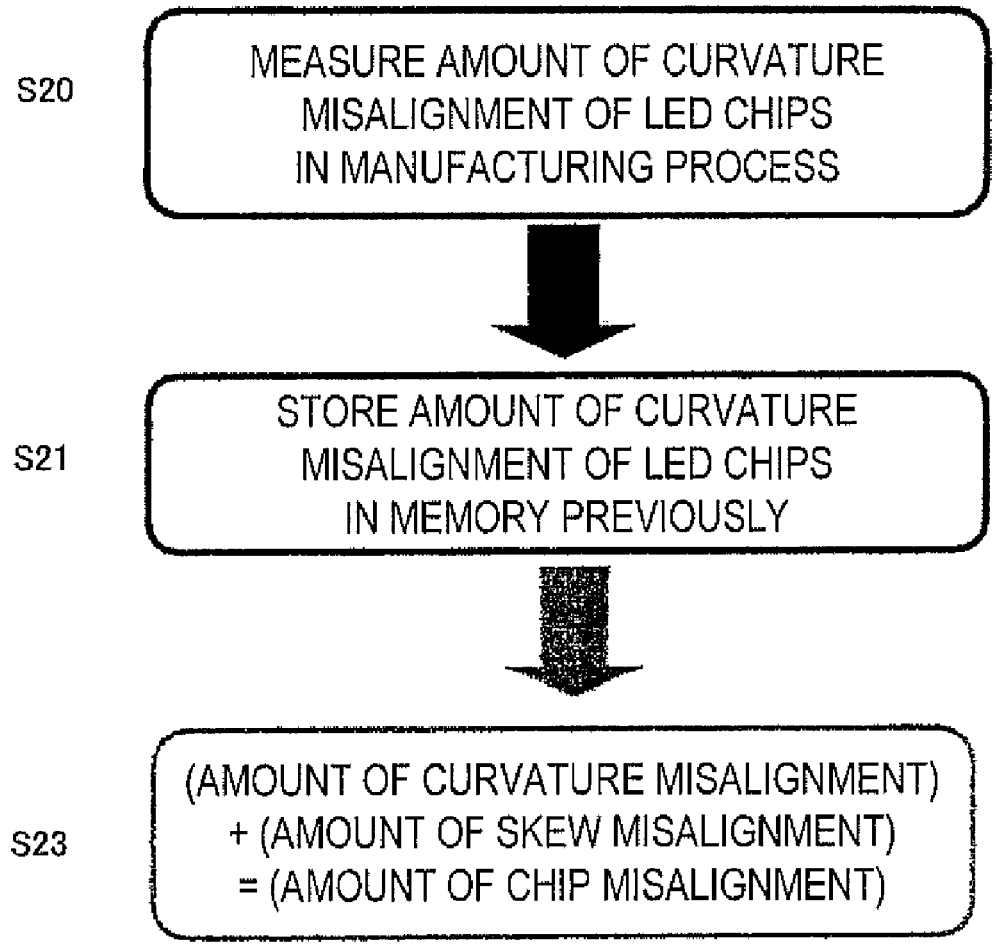
FIG. 5 is a flowchart showing a processing procedure of the embodiment of the invention.
Figure 6A:
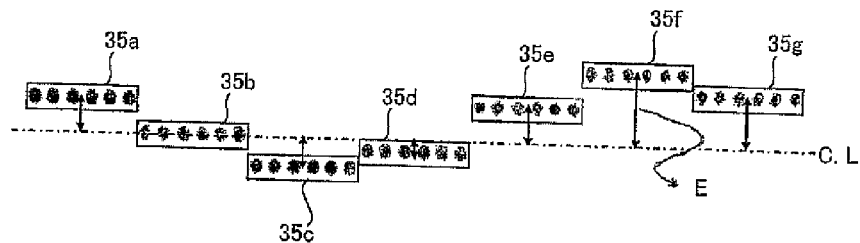
FIGS. 6A through 6D are explanatory diagrams showing an embodiment of the invention.
Figure 6B:
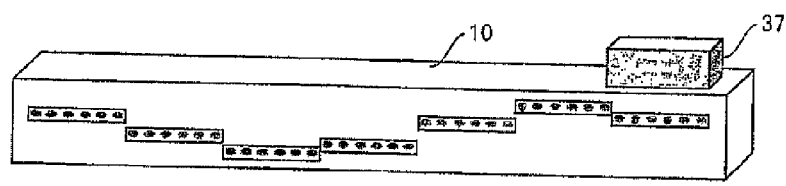
Figure 6C:
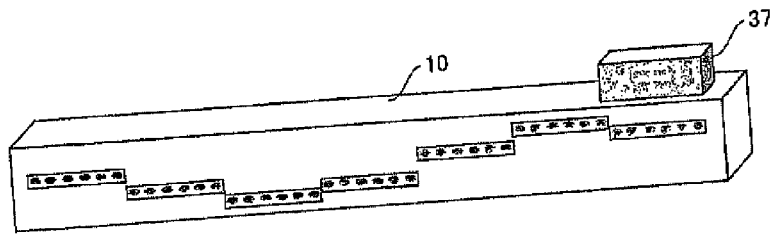

FIG. 5 is a flowchart of the example of obtaining the misalignment data of the line head explained in the example shown in FIGS. 19A to 19C, and FIGS. 6A through 6D are explanatory diagrams thereof. In FIG. 5, the amount of the curvature misalignment of the LED chip is measured when manufacturing the line head (S20). In FIG. 6A, an amount E of the curvature misalignment of each of the LED chips 35a through 35g from the center line C.L of the substrate is measured.

Subsequently, the line head is attached to the image forming device in FIG. 5, and the curvature misalignment amount of each of the LED chips is previously stored in a memory before shipment of the image forming device (S21). This process is for storing the curvature misalignment amount E of each of the LED chips previously in the memory 37 in FIG. 6B. As the memory 37, an EEPROM (a non-volatile memory) can be used as described later. Subsequently, in the step S23 of FIG. 5, the misalignment amounts of the LED chips are retrieved when printing. The misalignment amounts are obtained by adding the skew misalignment amounts to the curvature misalignment value (S23). This process corresponds to the process shown in FIG. 6C. It should be noted that although the example using the LEDs as the light emitting elements is explained in FIGS. 5 and 6A through 6D, the same process is executed in the case in which the organic EL elements are used as the light emitting elements.

Figure 6D:
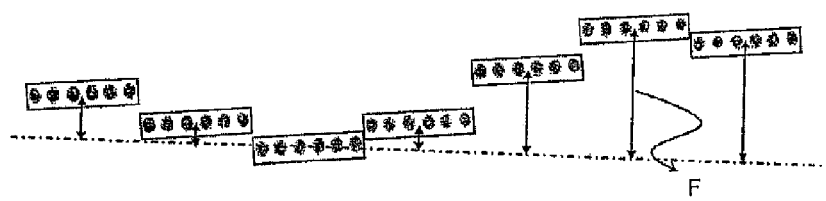

FIG. 6D is an explanatory diagram of an example in which the print start timing of each of the LED chips is controlled in accordance with the misalignment amount F of the LED chip. The control of the print start timing of the light emitting elements will be explained using the explanatory diagram of FIG. 7. The part A of FIG. 7 shows the original image data, namely image data Pa created by, for example, an external controller so that the printing process is executed thereon. The LED chips 35a through 35g are arranged in the line head at positions shifted from the LED chip 35c located at the reference position as shown in the part C of FIG. 7. The part B of FIG. 7 schematically shows the memory for driving each of the LED chips. For example, the LED chip 35a is arranged two lines shifted from the LED chip 35c located at the reference position in the Y direction, which is the rotational direction of the photoconductor viewed from the LED chip 35c located at the reference position. Therefore, the LED chip 35a is driven by a two-tiered memory 37a with the timing two lines delayed from that of the LED chip 35c located at the reference position.

As described above, since the print start timing is controlled so as to correspond to the misalignment amount of each of the LED chips in the sub-scanning direction with respect to the reference position using the memory 37, the deterioration in the image quality caused by the misalignment of the LED chip can be prevented. The part D of FIG. 7 shows a latent image Pb formed on the photoconductor. As shown in the part D of FIG. 7, image data Pb identical to the original image data Pa is formed on the photoconductor.

Figure 8:
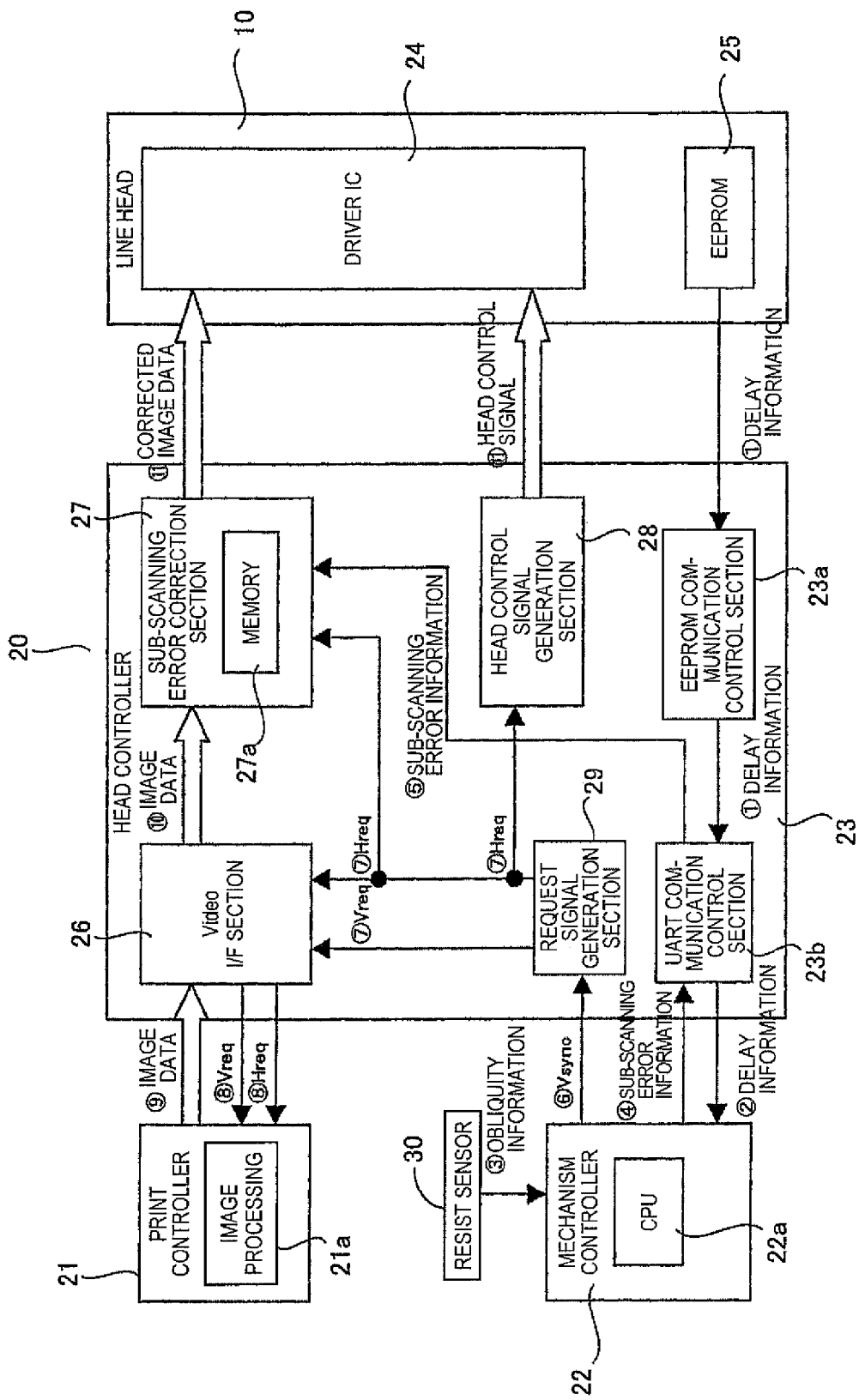
FIG. 8 is a block diagram showing an embodiment of the invention.

FIG. 8 is a block diagram of a control section in the embodiment of the invention. The line head 10 is provided with a driver IC 24 for controlling the light emitting elements, and an EEPROM 25 storing delay information formed in accordance with the curvature misalignment of the line head. The control section 20 is provided with a print controller 21, a mechanism controller 22, and a head controller 23.

The print controller 21 has an image processing section 21a, and the mechanism controller 22 has an arithmetic processing unit (CPU) 22a. Further, the head controller 23 is provided with an EEPROM communication control section 23a, a universal asynchronous receiver transmitter (UART) communication control section 23b, a video I/F 26, a sub-scanning error correction section 27 having the memory 27a, a head control signal generation section 28, and a request signal generation section 29. Detected information of a resist sensor 30 is input to the mechanism controller 22.

A control procedure in FIG. 8 will hereinafter be explained. It should be noted that the encircled numbers shown in the drawings will hereinafter be described as, for example, ○1 for the sake of convenience of character conversion. When the printer is powered on, the EEPROM communication control section 23a retrieves the delay information from the EEPROM 25 to transmit the information to the UART communication control section 23b (○1). The method of obtaining the delay information will be described later with reference to FIG. 9. The UART communication control section 23b transmits the delay information to the mechanical controller 22 (○2).

The mechanical controller 22 performs resist pattern print, and detects the print result using the resist sensor 30, thus calculating obliquity information (○3). The mechanical controller 22 adds the delay information to the obliquity information to calculate the sub-scanning error information, and transmits the sub-scanning error information to the UART communication control section 23b (○4). The UART communication control section 23b transmits the sub-scanning error information to the sub-scanning error correction section 27 (○5). The sub-scanning error correction section 27 stores the sub-scanning error information thus received in a register of the memory 27a.

When the print is started, the mechanical controller 22 detects an edge of a paper sheet, and transmits the Vsync signal (the video synchronization signal) to the request signal generation section 29 (○6). The request signal generation section 29 generates a Vreq signal (a video data request signal) and an Hreq signal (a line data request signal), and transmits the signals thus generated to the video I/F section (○7). Coincidentally, the Hreq signal is also transmitted to the sub-scanning error correction section 27 and the head control signal generation section 28, thus synchronizing modules. The video I/F section 26 transmits the Vreq signal and the Hreq signal to the print controller (○8).

The print controller 21 transmits the image data on which an image processing is executed to the video I/F section 26 using the Vreq signal and the Hreq signal, thus received, as a trigger (○9). On this occasion, it is preferable to execute a conversion (a parallel to serial conversion) on the image data in a parallel form to form serial data in order for reducing the wiring cost and for making the handling of the wiring easier, and to transmit the serial data with high-speed serial communication. The video I/F section 26 executes a serial to parallel conversion on the image data to transmit the data thus converted to the sub-scanning error correction section 27 (○10).

The sub-scanning error correction section 27 uses a plurality of line memories to correct the sub-scanning error of the latent image forming position with a predetermined main scanning resolution, and transmits the image data thus corrected to the line head 10 (○11). Coincidentally, the head control signal generation section 28 generates various kinds of head control signals (e.g., a clock signal, a start signal, and a reset signal), and transmits the head control signals to the line head 10 (○11). On this occasion, it is preferable to count the main scanning resolution of the sub-scanning error correction by the LED chip (composed of a predetermined number of light emitting elements one drive circuit can control) or by the lens (i.e., by the light emitter group). Thus, the sub-scanning error caused in the connection points between the LED chips or the connection points between the lenses can be corrected.

Figure 9:
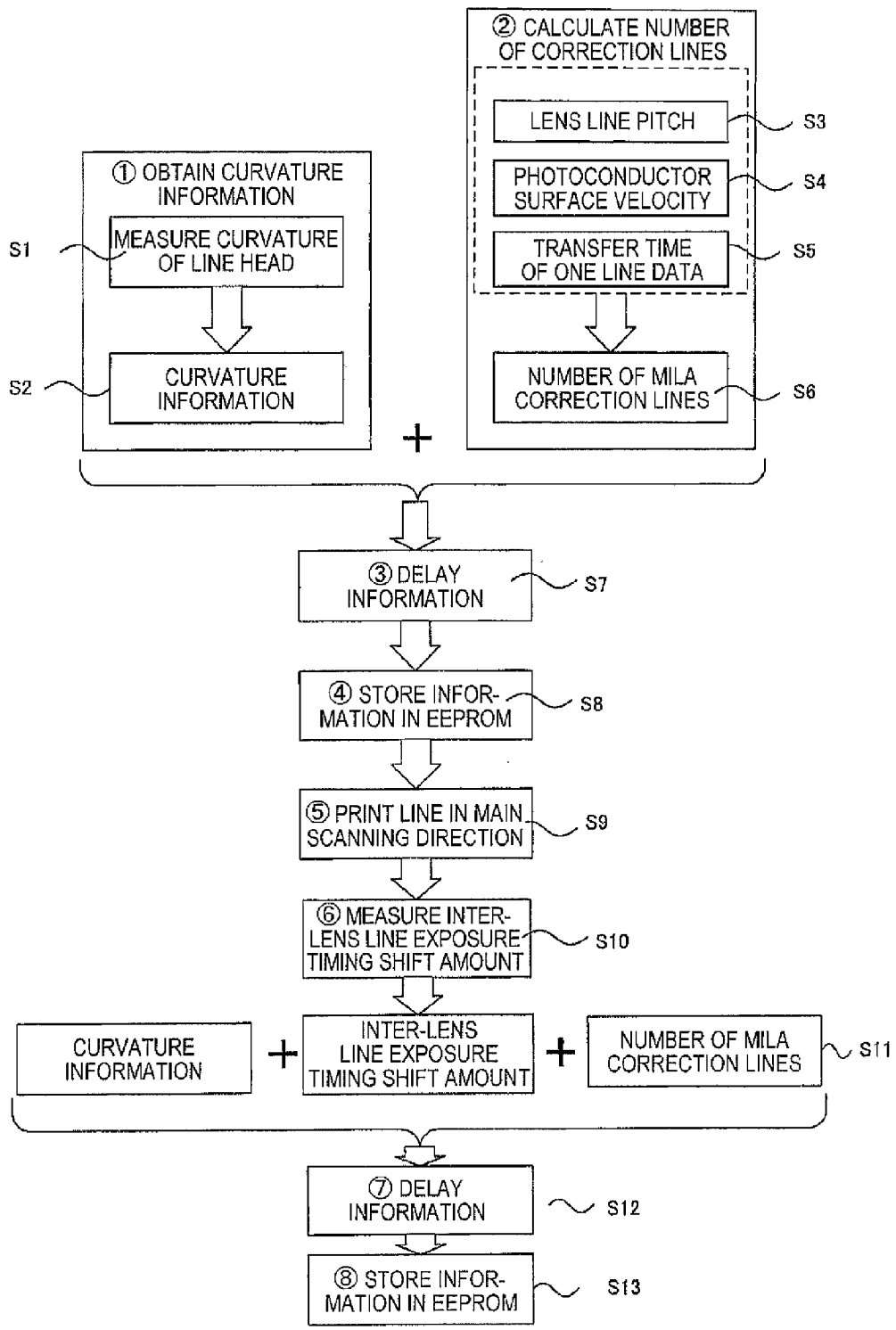
FIG. 9 is a flowchart showing a processing procedure of the embodiment of the invention.

FIG. 9 is a flowchart showing the procedure of obtaining the delay information stored in the EEPROM 25 shown in FIG. 8 described above. In FIG. 9, the curvature information of the line head is obtained first (○1). In this process, the curvature amount of the line head is measured by an optical sensor or the like (S1), and obtains the curvature information converted to have a line as a unit (S2). Subsequently, the number of correction lines is calculated (○2). In this process, a lens line pitch (S3), a photoconductor surface velocity (S4), and transfer time (S5) of single line data are obtained. Using these numerical values and the formulas 1, 2 described later, the number of MLA correction lines is calculated (S6). In the subsequent process (○3), the curvature information and the number of the MLA correction lines are added to each other to calculate the delay information (S7).

Subsequently, the following process is executed. The delay information is stored in the EEPROM (○4, S8). The image having a line drawn in the main scanning direction is printed (○5, S9). An inter-lens exposure timing shift amount in the print result is measured using an optical microscope (○6, S10). Subsequently, the inter-lens exposure timing shift amount, the curvature information, and the number of the MLA correction lines are added to each other (S11) to calculate the delay information again (○7, S12). Finally, the delay information is stored in the EEPROM (the non-volatile memory) (○8, S13).

Figure 10:
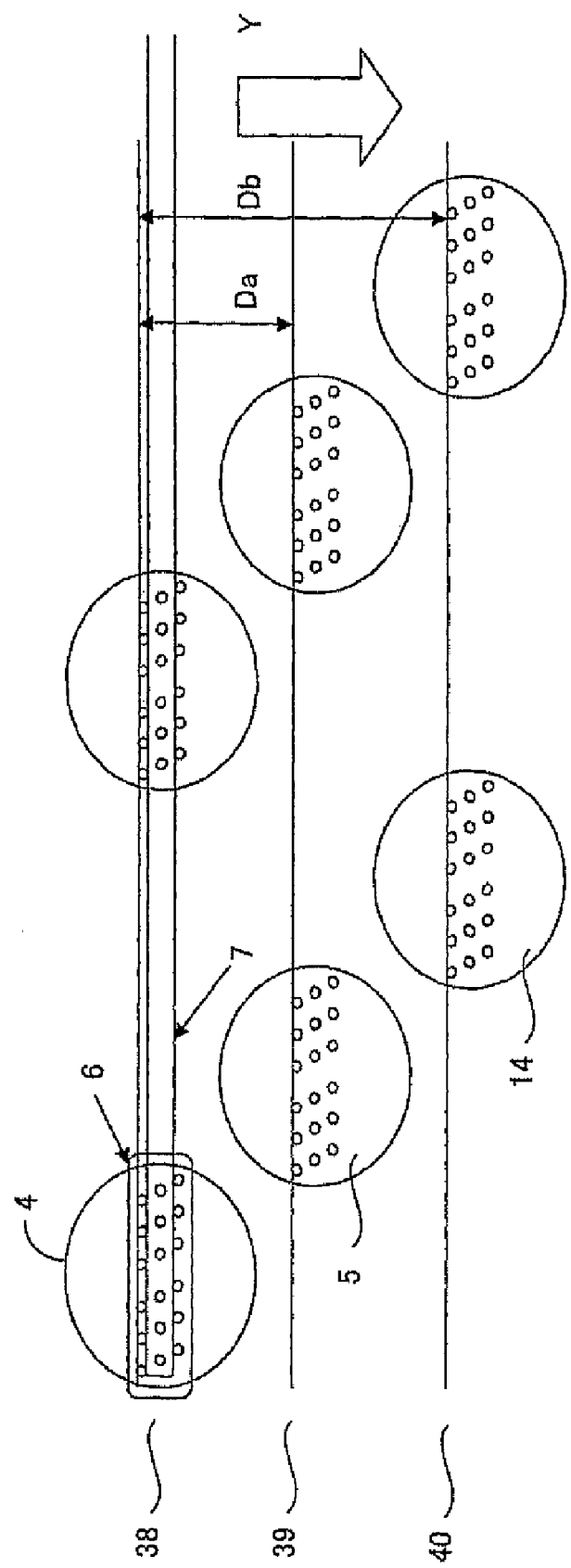
FIG. 10 is an explanatory diagram showing an embodiment of the invention.

FIG. 10 is an explanatory diagram of an example of calculating the number of the MLA correction lines described above. The imaging lens arrays 4, 5, 14 are provided with individual imaging lenses 4a, 5a, 14a arranged respectively. Further, the light emitting element group line 7 is arranged corresponding to the imaging lens array 4. The reference numeral 6 denotes the light emitting element group. The light emitting element group lines are also arranged corresponding to the other imaging lens arrays 5, 14. In the case in which the exposure position misalignment of each of the light emitting element group lines in the MLA is corrected by line (the sub-scanning direction resolution), the number Nhn of the correction lines can be obtained by the formulas 1, 2 described below using the imaging lens line pitches Da, Db, and the photoconductor surface velocity Vopc.

In the case with the lens line pitch of Da, the exposure delay time Tdly of the light emitting element group line is obtained as follows.

$$Tdly = Da/Vopc \quad (1)$$

Further, assuming that the transfer time of single line data is Thr, the number Nhn of the MLA correction lines is obtained as follows.

$$Nhn = Tdly/Thr \quad (2)$$

In practice, the number Nhn of lines is obtained by rounding the number to the nearest integer.

Figure 11:
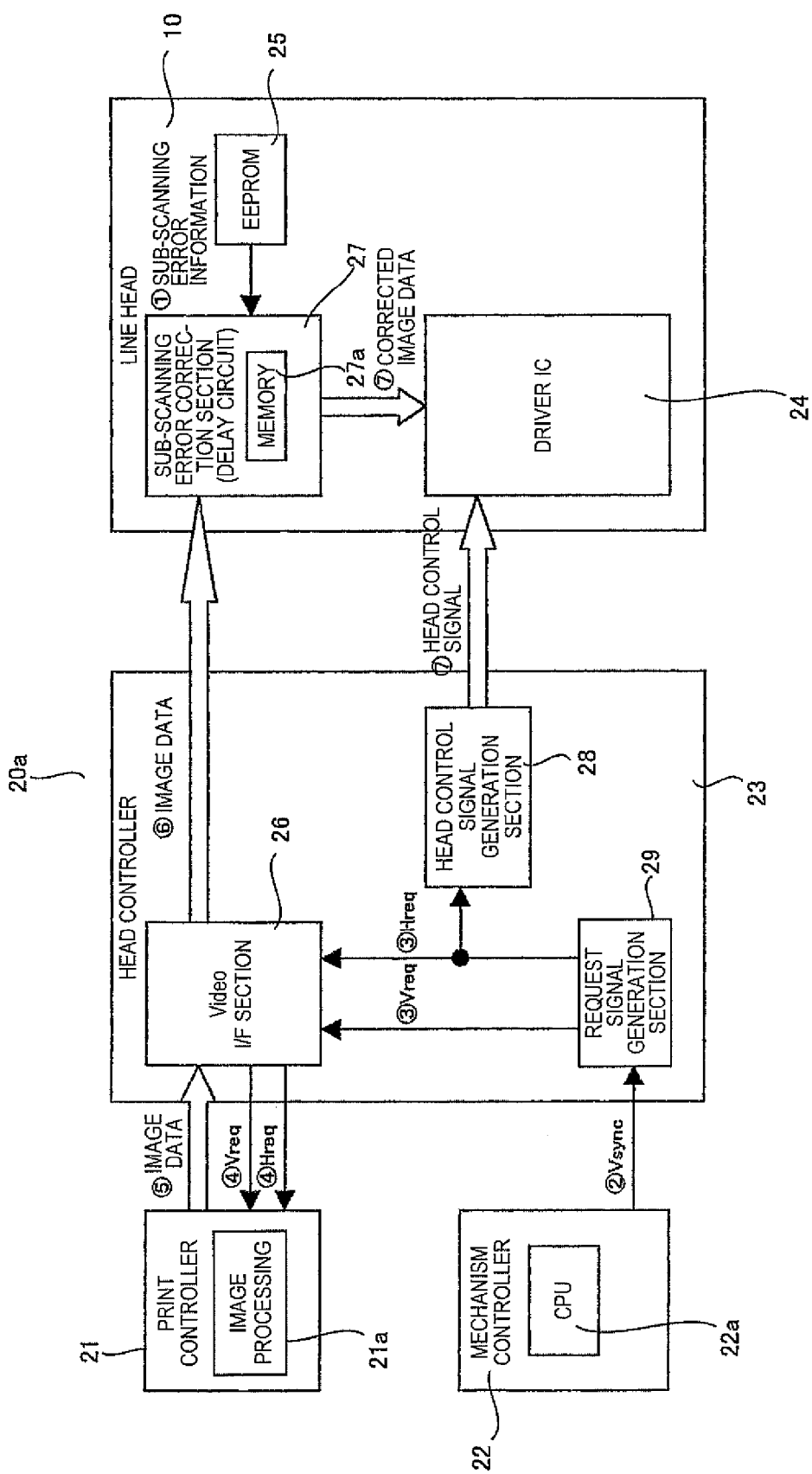
FIG. 11 is a block diagram showing an embodiment of the invention.

FIG. 11 is a block diagram of a control section 20a in another embodiment of the invention. The same parts as in FIG. 8 are denoted with the same reference numerals, and detailed explanations therefor will be omitted. The line head is provided with the sub-scanning error correction section 27 besides the driver IC 24 and the EEPROM 25. The sub-scanning error correction section 27 has a function as the delay circuit as described later. The print controller 21 and the mechanism controller 22 have the same configurations as shown in FIG. 8. The head controller 23 is provided with the video I/F 26, the head control signal generation section 28, and the request signal generation section 29.

A processing procedure in FIG. 11 will hereinafter be explained. When the printer is powered on, the sub-scanning error information previously stored in the EEPROM is retrieved therefrom, and transmitted to the sub-scanning error correction section (the delay circuit) (○1). Acquisition of the sub-scanning error information will be explained with reference to FIG. 12. When the print is started, the mechanical controller 22 detects an edge of a paper sheet, and transmits the Vsync signal to the request signal generation section 29 (○2). The request signal generation section 29 generates a Vreq signal (a video data request signal) and an Hreq signal (a line data request signal), and transmits the signals thus generated to the video I/F section 26 (○3). Coincidentally, the Hreq signal is also transmitted to the sub-scanning error correction section 27 and the head control signal generation section 28, thus synchronizing modules.

The video I/F section 26 transmits the Vreq signal and the Hreq signal to the print controller 21 (○4). The print controller 21 transmits the image data on which an image processing is executed to the video I/F section 26 using the Vreq signal and the Hreq signal, thus received, as a trigger (○5). On this occasion, it is preferable to execute a conversion (a parallel to serial conversion) on the image data in a parallel form to form serial data in order for reducing the wiring cost and for making the handling of the wiring easier, and to transmit the serial data with high-speed serial communication.

The video I/F section 26 executes a serial to parallel conversion on the image data to transmit the data thus converted to the sub-scanning error correction section 27 of the head (○6). The sub-scanning error correction section 27 uses a plurality of line memories to correct the sub-scanning error with a predetermined main scanning resolution, and transmits the image data thus corrected to the driver IC of the line head (○7). Coincidentally, the head control signal generation section 28 generates various kinds of head control signals (e.g., a clock signal, a start signal, and a reset signal), and transmits the head control signals to the driver IC of the line head (○7).

Figure 12:
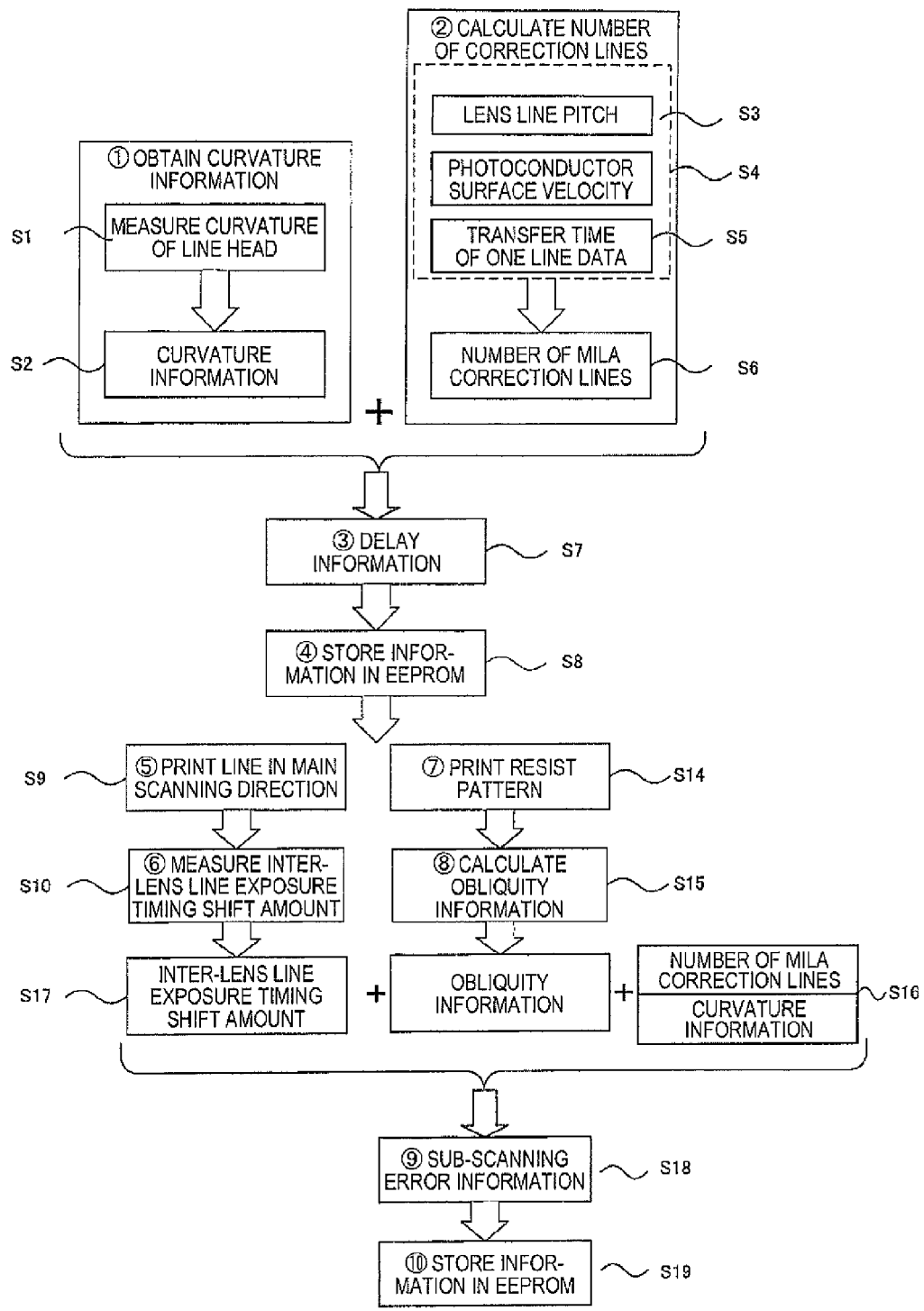
FIG. 12 is a flowchart showing a processing procedure of the embodiment of the invention.

FIG. 12 is a flowchart showing a procedure of acquiring the misalignment information of the latent image forming position in the sub-scanning direction described above. In FIG. 12, the same processes as those shown in FIG. 9 are denoted with the same step (S) numbers. Further, since the processing contents of the steps corresponding to the encircled numbers ○1 through ○6 are the same as those shown in FIG. 9, the explanations of the encircled numbers corresponding to this part will be omitted.

The curvature amount of the line head is measured by an optical sensor or the like (S1), and obtains the curvature information converted to have a line as a unit (S2). Further, the number of the MLA correction lines is calculated (S6) using the lens line pitch (S3), the photoconductor surface velocity (S4), the transfer time (S5) of single line data, and the formulas 1, 2 described above.

Subsequently, the curvature information (S2) and the number (S6) of the MLA correction lines are added to each other to calculate the delay information (S7), and the delay information is stored in the EEPROM (S8). Subsequently, the image including a line drawn along the main scanning direction (S9), and the inter-lens line exposure timing shift amount in the print result is measured using the optical microscope or the like (S10). Further, the resist pattern is printed (○7, S14), and the print result is detected by the resist sensor or the like to calculate the obliquity information (○8, S15).

In the process of S17, the inter-lens line exposure timing shift amount (S10), the obliquity information (S15), the curvature information (S2), and the number (S16) of the MLA correction lines are added to each other to calculate the sub-scanning error information (○9, S18). The sub-scanning error information is stored in the EEPROM (○10, S19).

FIG. 13 is an explanatory diagram showing the latent image in the case in which the exposure position misalignment of the MLA is not corrected. In FIG. 13, Ta represents the inter-lens line exposure position misalignment of the MLA, and Tb represents intra-lens exposure position misalignment of the MLA. The reference symbols 6a, 6b, and 6c show the patterns of the latent images formed on the photoconductor by the output beams transmitted through the imaging lens arrays 4, 5, 14, respectively, described with reference to FIG. 10.

FIG. 14 is an explanatory diagram showing the latent image in the case in which the exposure position misalignment of the MLA is corrected. In this case, the latent image 15 is formed on the photoconductor by the output light beams transmitted through the MLs as the patterns denoted with 17a through 17f, respectively. In other words, the latent image is formed linearly along the axial direction (the main scanning direction) of the photoconductor. Therefore, the deterioration of the image quality can be prevented. In the correction, the following processes are executed assuming that the moving direction of the photoconductor is Y. In the example of the part of the latent image corresponding to the pattern 6a in FIG. 13, the inter-lens exposure position misalignment correction is executed using the latent image line k as a reference. In other words, the latent image line m is formed with the timing one line delayed from the latent image line k. Further, the latent image line n is formed with the timing two lines delayed from the latent image line k.

In the part of the latent image corresponding to the patterns 6b, 6c, the exposure position misalignment correction is also executed by delaying the latent image line by line in a similar manner. In the inter-lens line exposure position misalignment correction, the pattern 6b of the latent image is one unit timing delayed from the pattern 6a of the latent image as a reference in the Y direction, and the pattern 6c of the latent image is two unit timing delayed therefrom in the Y direction. Therefore, in the actual exposure position correction, the latent image lines m through u are formed with the timing with the delay sequentially increasing by line in the Y direction from the latent image line k of the latent image pattern 6a used as the reference. The delay control as described above can be executed with the configuration of stacking the memories as explained with reference to the schematic diagram shown in the part B of FIG. 7.

FIG. 15 is an explanatory diagram showing another example of the latent image formation. Since there exist individual differences in the lens line pitch of the MLA and the diameter of the photoconductor, there are caused errors in the lens line pitch Da and the photoconductor surface velocity Vopc. In other words, due to the individual differences in the MLA and the photoconductor, the number Nhn of the MLA correction lines varies. Therefore, since the ideal lens pitch and the distance corresponding to the number of the MLA correction lines obtained from the ideal photoconductor surface velocity are different from each other, in the case in which the linear latent image is drawn along the main scanning direction in the actual image forming device, the individual differences of the MLA and the photoconductor cause a slight step (the inter-lens exposure timing shift) on the boundary between the lenses. FIG. 15 shows the latent image having the slight step caused on the boundary between the lenses by the individual differences of the MLA and the photoconductor in the case in which the exposure position misalignment of the MLA described above is corrected.

Figure 16:
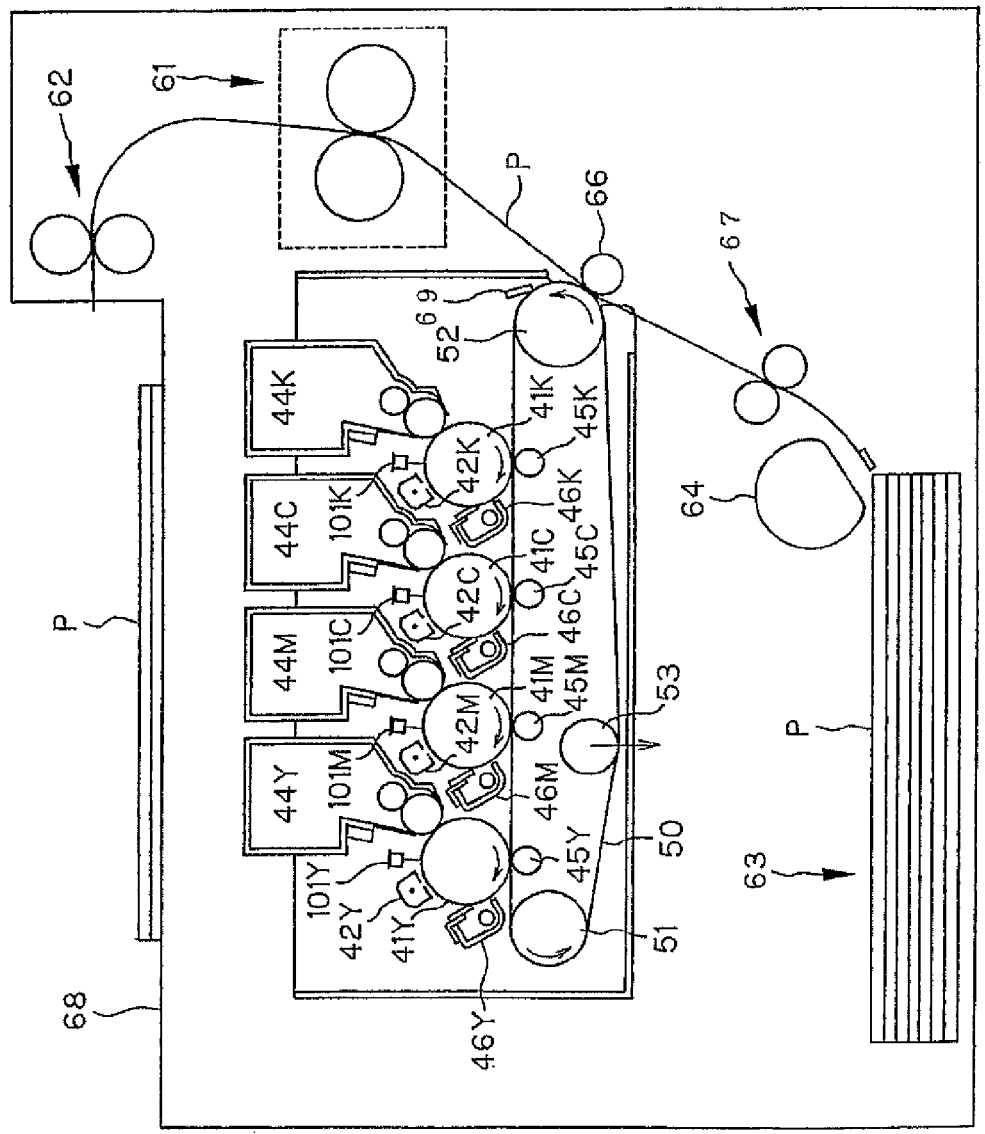
FIG. 16 is a vertical cross-sectional view of an image forming device according to an embodiment of the invention.

In the embodiment of the invention, a line head used for a tandem type color printer (an image forming device), which exposes four photoconductors with four line heads, forms an image with four colors at one time, and transfers it to one endless intermediate transfer belt (an intermediate transfer medium), is intended. FIG. 16 is a vertical cross-sectional side view showing an example of the tandem type image forming device using organic EL elements as the light emitting elements, This image forming device includes four line heads 101K, 101C, 101M, and 101Y each having the same configuration and disposed at a position for exposing respective one of four photoconductors (image carriers) 41K, 41C, 41M, and 41Y each having the same configuration.

As shown in FIG. 16, the image forming device is provided with a drive roller 51, a driven roller 52, a tension roller 53, and an intermediate transfer belt (the intermediate transfer medium) 50 stretched across the rollers to be tensioned by the tension roller 53 and circulated in the direction of the arrows (counterclockwise) shown in the drawing. The photoconductors 41K, 41C, 41M, and 41Y are disposed with predetermined intervals with respect to the intermediate transfer belt 50. The letters K, C, M, and Y attached behind the reference numerals denote black, cyan, magenta, and yellow, respectively. The photoconductors 41K, 41C, 41M, and 41Y are rotationally driven in the direction of the arrows (clockwise) shown in the drawing in sync with driving of the intermediate transfer belt 50. In the peripheral spaces of the photoconductors 41 (K, C, M, Y), there are disposed charging members 42 (K, C, M, Y) and the line heads 101 (K, C, M, Y), respectively.

Further, there are provided developing devices 44 (K, C, M, Y) for providing toner as a developer to the electrostatic latent image formed by the line heads 101 (K, C, M, Y) to make the latent image into a visible image, primary transfer rollers 45 (K, C, M, Y), and cleaning devices 46 (K, C, M, Y), respectively. It is arranged that the peak emission energy wavelengths of the line heads 101 (K, C, M, Y) are substantially equal to the peak sensitivity wavelengths of the photoconductors 41 (K, C, M, Y), respectively.

Each of the four toner images of black, cyan, magenta, and yellow each formed by the monochromatic toner image forming station is sequentially primary-transferred on the intermediate transfer belt 50 in accordance with the primary transfer bias applied to the primary transfer rollers 45 (K, C, M, Y). The full color toner image formed by sequentially stacking the four toner images of respective colors on the intermediate transfer belt 50 is then secondary-transferred to a recording medium P such as a paper sheet in a secondary-transfer roller 66, and then fixed on the recording medium P by passing through a fixing roller pair 61 as a fixing section, and then discharged on a paper receiving tray 68 provided to the top section of the device by a paper discharge roller pair 62.

The reference numeral 63 denotes a paper feed cassette in which a number of sheets of recording media P are stacked and held, the reference numeral 64 denotes a pick-up roller for feeding the recording medium P sheet by sheet from the paper feed cassette 63, the reference numeral 65 denotes a gate roller pair for defining feed timing of the recording medium P to the secondary-transfer section of the secondary-transfer roller 66, the reference numeral 66 denotes the secondary-transfer roller as a secondary transfer member forming a secondary-transfer section together with the intermediate transfer belt 50, and the reference numeral 69 denotes a cleaning blade for removing toner remaining on the surface of the intermediate transfer belt 50 after the secondary-transfer process.

In the embodiments of the invention, LEDs, organic EL, Vertical Cavity Surface Emitting Lasers (VCSEL), and so on can be used as the light emitting elements of the light emitter array. Further, SELFOC™ lens arrays (SLA), microlens arrays (MLA), and so on can be used as the lens arrays.

Another embodiment of the invention will hereinafter be explained. FIGS. 20A and 20B are diagrams selectively showing the region focusing on an exposure head and a photoconductor drum of an image forming device according to another embodiment of the invention, wherein FIG. 20A is a diagram showing the region viewed from a first direction along the rotational shaft of the photoconductor drum, and FIG. 20B shows the region viewed from a direction perpendicular to the first direction. Further, FIG. 21 is a diagram showing the positional relationship between the light emitting elements, an imaging optical system, and so on in the exposure head of the image forming device according to the another embodiment.

Figure 21:
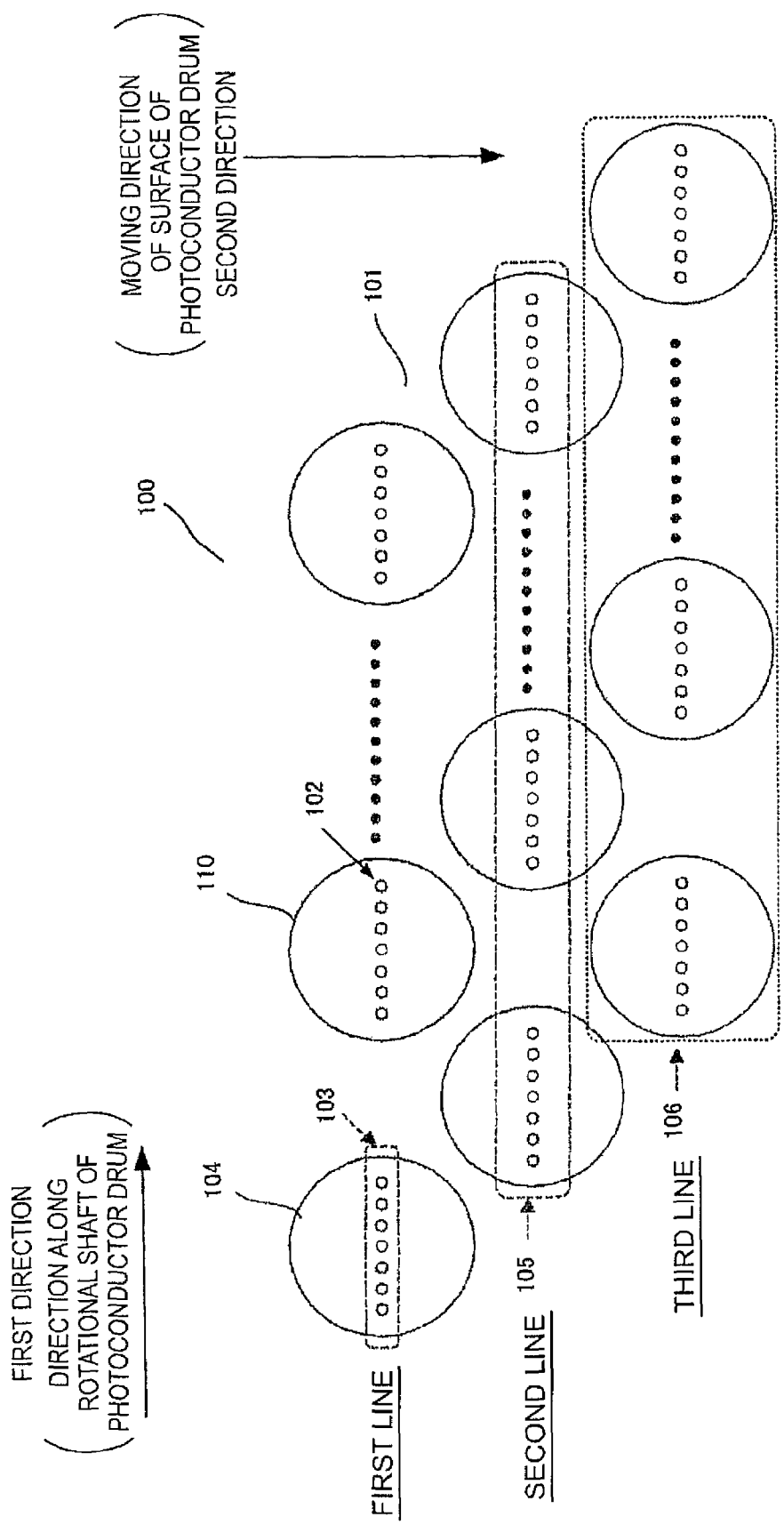
FIG. 21 is an explanatory diagram showing another embodiment of the invention.

In FIGS. 20A, 20B, and 21, the reference numeral 100 denotes the exposure head, the reference numeral 101 denotes a light emitting element substrate, the reference numeral 102 denotes a light emitting element, the reference numeral 103 denotes a light emitting element group, the reference numeral 104 denotes an imaging optical system, the reference numeral 105 denotes a light emitting element line, the reference numeral 106 denotes an imaging optical system line, the reference numeral 110 denotes an imaging lens, the reference numeral 150 denotes the photoconductor drum, the reference numeral 155 denotes the rotational shaft, and the reference numeral 160 denotes a gear. It should be noted that the exposure head 100 corresponds to the line head explained in the preceding embodiments.

The exposure head 100 has an elongated shape along the rotational shaft 155 of the photoconductor drum 150, and disposed so as to be opposed to the photoconductor drum 150. Here, in the present specification, the direction along the rotational shaft 155 of the photoconductor drum 150 is defined as the first direction. The rotational shaft 155 of the photoconductor drum 150 is provided with the gear 160, and it is arranged that the photoconductor drum 150 is rotated by the rotational driving force applied from a driver, not shown, via the gear 160. Further, it is configured that the surface of the photoconductor drum 150 is charged by a charging member, not shown, to which the exposure head 100 draws an electrostatic latent image.

As a light source of the exposure head 100, a plurality of light emitting elements 102 is disposed on the light emitting element substrate 101, and the light emitting elements 102 are selectively made emit light. Further, the light beams from the light emitting elements 102 are respectively focused on the surface of the photoconductor drum 150 by the imaging optical system 104, thereby drawing a predetermined electrostatic latent image on the surface of the photoconductor drum 150.

In the present embodiment, organic EL elements are used as the light emitting elements 102 disposed on the light emitting element substrate 101. By using such organic EL elements, there can be obtained an advantage that a plurality of light emitting elements 102 can be manufactured on a single light emitting element substrate 101 with relative ease, and adjustment is easier in comparison with the case with the LED elements, which requires to use a plurality of light emitting element substrates for manufacturing the exposure head. However, in the present embodiment, it is obvious that the LED elements can also be used as the light emitting elements 102.

Further, in the present embodiment, although it is configured to use a single imaging lens 110 as the imaging optical system 104, it is also possible to use a plurality of imaging lenses as the imaging optical system 104, thereby improving the optical accuracy.

Further, in the present embodiment, there is used a lens array having the imaging lenses 110 arranged in a two-dimensional manner to form a single component.

Further, in the present embodiment, the array of the microlenses is used as the imaging optical system 104 to form the imaging optical system with the negative optical magnification. It is possible to use the SELFOC™ lens array (SLA) as the imaging optical system with the positive optical magnification instead of the microlens array (MLA) as the imaging optical system with the negative optical magnification described above.

As shown in FIG. 21, every seven of the light emitting elements 102 of the light emitting element substrate 101 form a light emitting element group 103, and it is arranged that one imaging optical system 104 is in charge of all of the light emitting elements 102 belonging to one light emitting group 103.

Further, a plurality of the light emitting element groups 103 is arranged along the first direction, thereby forming the light emitting element line 105. Further, the imaging optical system line 106 is formed so as to correspond to the light emitting element line 105. Here, in the present specification, the direction perpendicular to the first direction, along which the surface of the photoconductor drum 150 is moved is defined as a second direction.

On the light emitting element substrate 101, there are disposed three light emitting element lines 105 arranged in the second direction and shifted slightly in the first direction sequentially from the adjacent line. Further, corresponding to this arrangement, there are disposed three imaging optical system lines 106 shifted slightly in the first direction sequentially from the adjacent line as shown in the drawing. Due to such a positional relationship, the light beams to be imaged by the imaging optical systems respectively arranged in the second direction are arranged to be imaged on the photoconductor drum 150 at positions different in the second direction and also different in the first direction. According to such a positional relationship, it becomes possible to make the deterioration of image quality caused by banding less noticeable.

According to the configuration described above, since the shading caused by banding is scattered in all directions in the image to be formed, it becomes possible to prevent the deterioration of the image quality caused by banding.

Further, in the exposure head 100, since the light emitting element line 105 has the positional relationship as described above, in order for forming a linear or substantially linear latent image in the first direction of the photoconductor drum 150, there is executed the control for making the light emitting timing of the light emitting elements different between the imaging optical system lines such that the first light emitting element line 105 is made emit light, then the second light emitting element line 105 is made emit light, and then the third light emitting element line 105 is made emit light.

Figure 22:
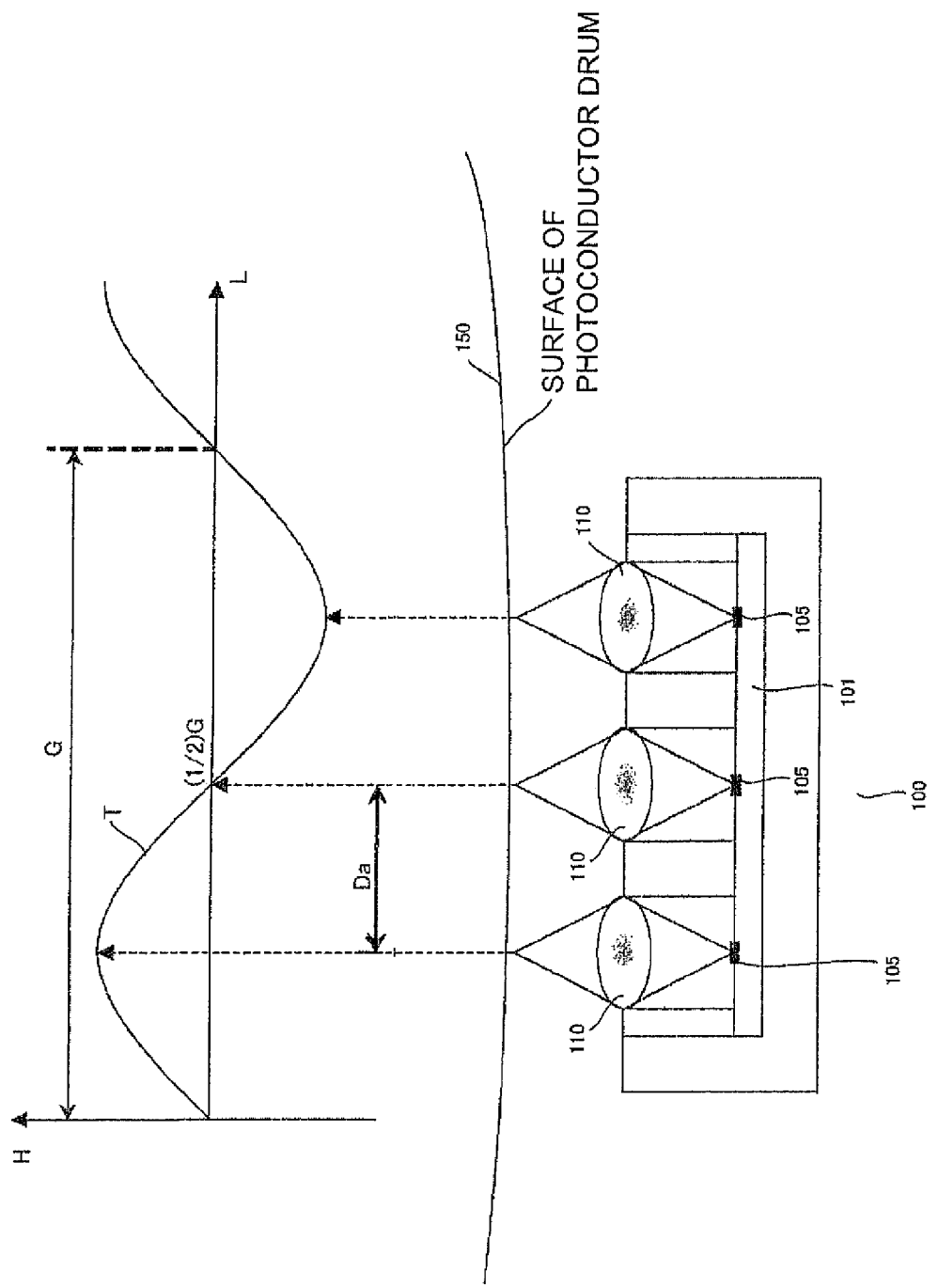
FIG. 22 is an explanatory diagram showing another embodiment of the invention.

FIG. 22 is a diagram schematically showing the exposure head 100 and the photoconductor drum 150. As shown in FIG. 22, the exposure head 100 has the light emitting element lines 105 arranged on the light emitting element substrate 101 in lines in the axial direction (the first direction) of the photoconductor drum 150. The imaging lens 110 is an imaging lens for forming the imaging optical system 104.

The vertical axis H of the characteristic diagram shown in FIG. 22 represents the velocity variation of a drive mechanism for driving the photoconductor drum 150 caused by the banding thereof, and the horizontal axis L thereof represents the distance in a direction perpendicular to the axial direction of the photoconductor drum 150. The velocity variation characteristic T on this occasion varies periodically with the gear pitch G of the drive mechanism for driving the photoconductor drum 150 as a cycle.

In the embodiment according to the invention, the imaging position in the rotational direction of the photoconductor drum is different between the imaging optical system lines 106. Therefore, if all of the light emitting elements of the exposure head 100 simultaneously emit light once, the latent image along the axial direction (the main scanning direction) formed on the photoconductor drum 150 has a meandering shape similarly to the arrangement of the light emitting elements shown in FIG. 21.

The pitch Da (the pitch in the sub-scanning direction) between the imaging lenses 110 corresponds to a pitch of the latent image lines formed on the photoconductor drum 150. By arranging the pitch Da to be longer than a half the gear pitch G of the drive mechanism, the convex part and the concave part of the velocity variation characteristic T cancel each other, thus the influence of the banding can be made obscure.

It should be noted that the gear pitch G mentioned in the present embodiment does not denote the pitch of the gear 160 itself. The gear pitch C mentioned in the present embodiment is obtained by reducing the gear pitch of the gear 160 itself to the pitch on the surface of the photoconductor drum 150.

Figure 23:
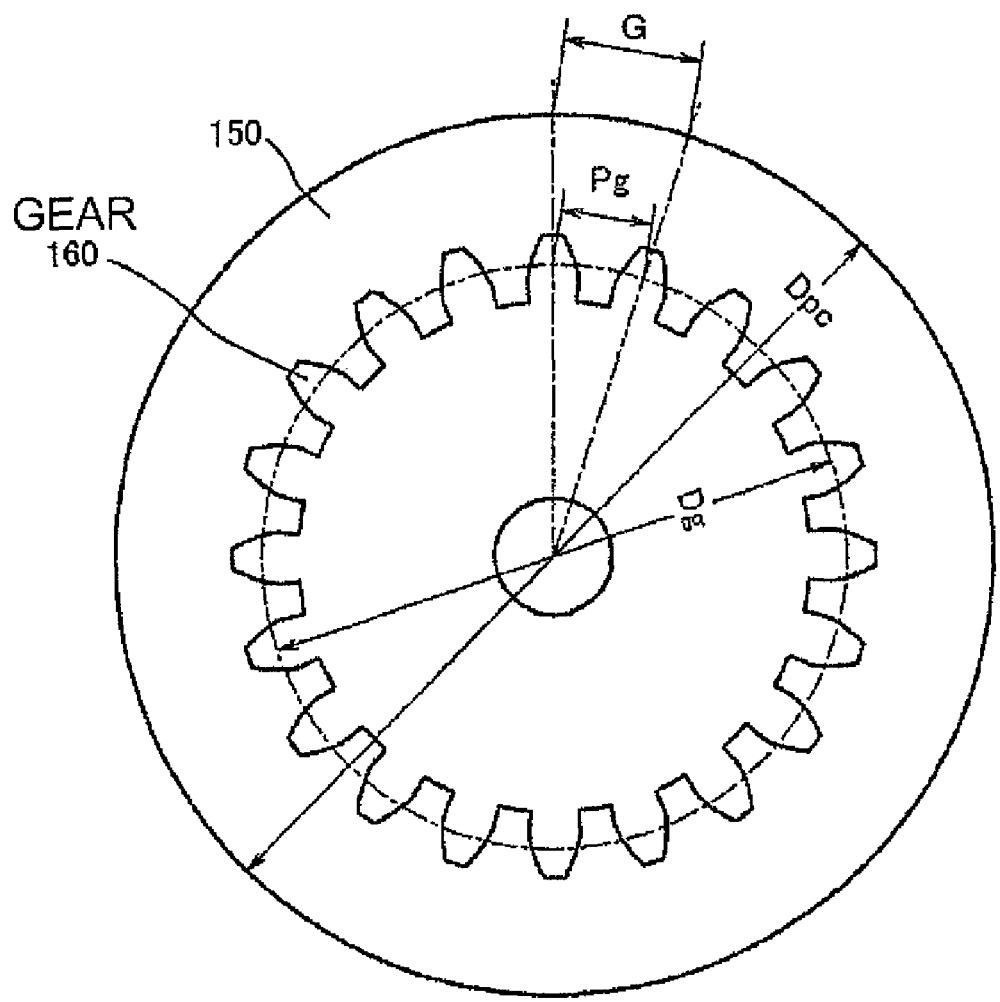
FIG. 23 is a diagram for explaining a calculation method of the gear pitch.

FIG. 23 is a diagram for explaining the calculation method of the gear pitch G in the embodiment of the invention. In FIG. 23, Pg denotes the actual gear pitch of the gear 160, Dg denotes the pitch diameter of the gear 160, and Dpc denotes the diameter of the photoconductor drum 150. On this occasion, the gear pitch G in the present embodiment is calculated by the following formula.

$$G = Pg \times (Dpc/Dg)$$

As a sum-up, in the present embodiment, assuming that the gear 160 having the pitch G for transmitting the force to the photoconductor drum 150 is provided, and the distance between the imaging optical system lines 106 is Da, by adopting the configuration satisfying the following relationship, the influence of the banding can be made less noticeable.

$$Da > (1/2) \times G$$

Figure 24A:
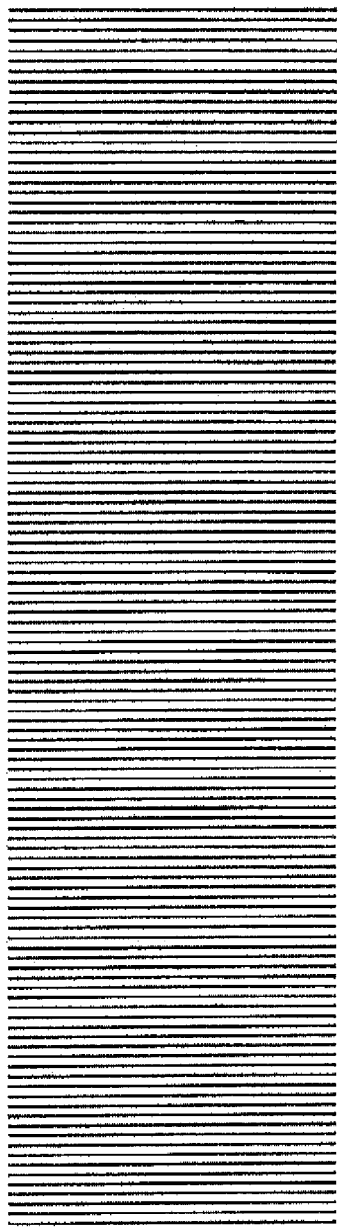
FIGS. 24A through 24C are explanatory diagrams showing an advantage of another embodiment of the invention.
Figure 24B:
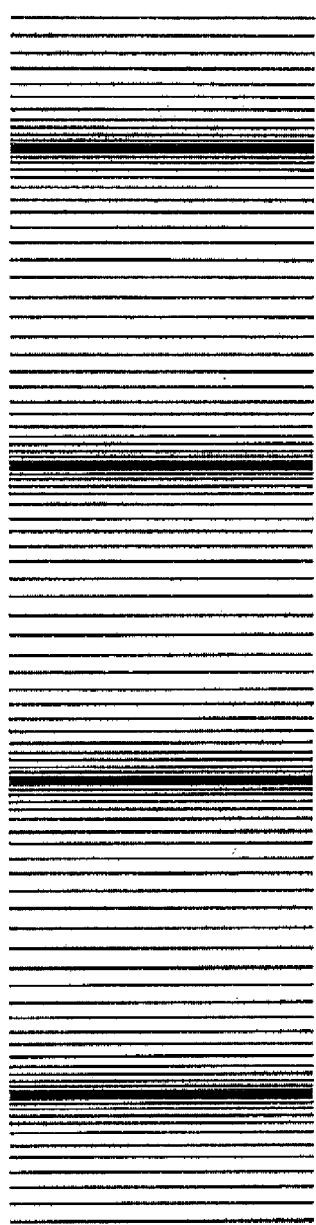
Figure 24C:
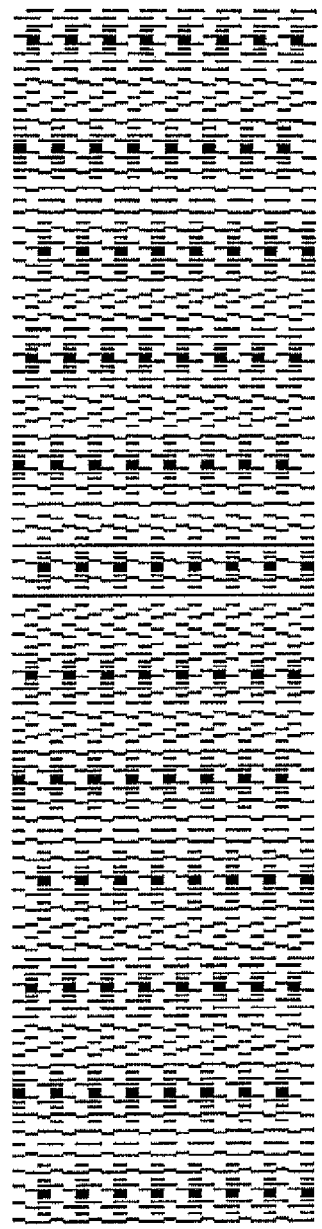

FIGS. 24A through 24C are diagrams showing the advantage of the embodiment of the invention. FIG. 24A is a diagram showing an image in the case in which no banding occurred at all, FIG. 24B is a diagram showing an image in the case in which the banding occurred in an image forming device of the related art, and FIG. 24C is a diagram showing an image in the case in which the banding occurred in the image forming device according to the invention.

FIG. 24B shows an image formed by the exposure head provided with the light emitting elements of the related art disposed along only one line in the first direction. In contrast, FIG. 24C is a diagram showing the image formed by the exposure head according to the invention. It should be noted that either of the FIGS. 24A through 24C shows the image in the condition having the pitch G=1.2 mm, and the pitch Da=0.8 mm as an example of the numerical values.

In the image shown in FIG. 24B, since the periodical shading is caused vertically by banding, the deterioration of the image quality caused by banding becomes very noticeable. In contrast, in the image shown in FIG. 24C, since the parts where the shading is caused by banding are scattered in all directions in the image, the deterioration of the image quality caused by banding is less noticeable.

Figure 25:
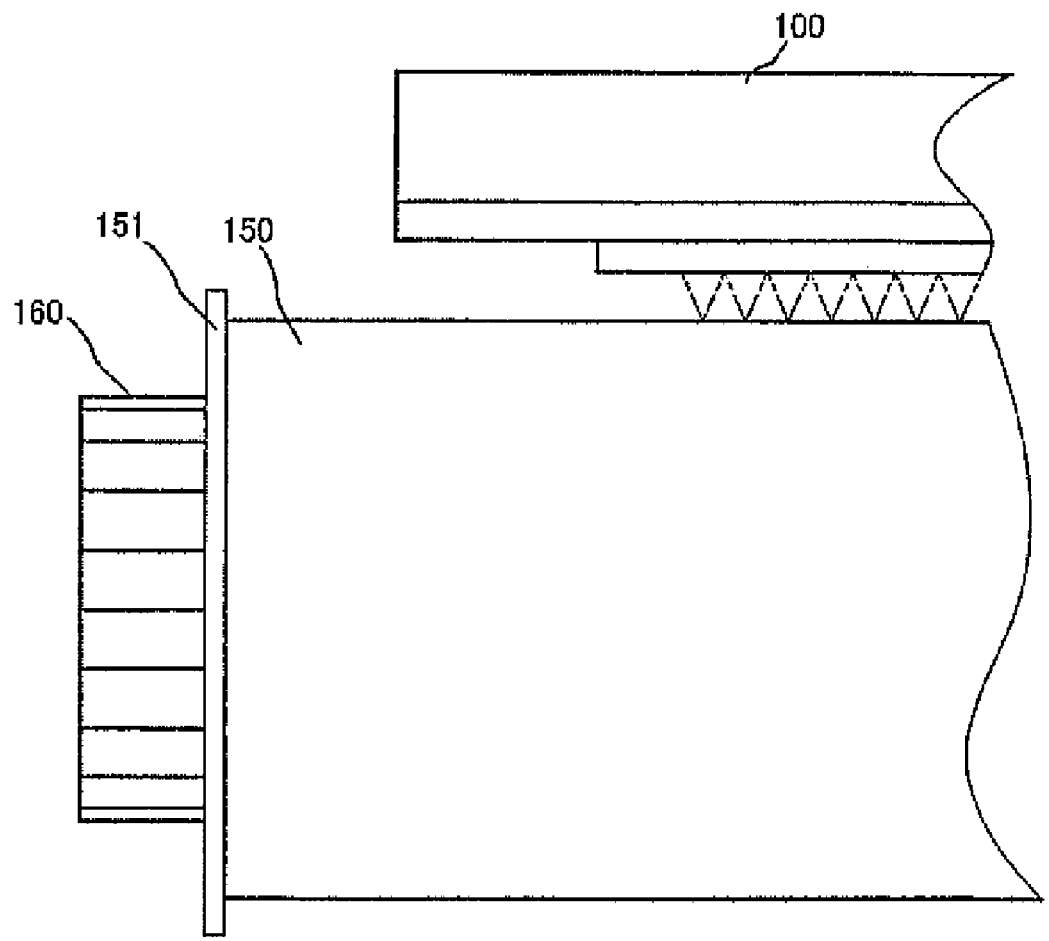
FIG. 25 is an explanatory diagram showing another embodiment of the invention.

Another embodiment of the invention will hereinafter be explained. FIG. 25 is a diagram selectively showing the region focusing on the exposure head and the photoconductor drum of an image forming device according to the another embodiment of the invention, which is a diagram showing the region viewed from a direction perpendicular to the first direction. In the present embodiment, the photoconductor drum 150 is provided with flanges 151 disposed on both ends thereof, and has a structure in which the gear 160 is fixed to one of the flanges 151. Even in such an embodiment, the same advantage as in the case with the preceding embodiments can be obtained.

Figure 26:
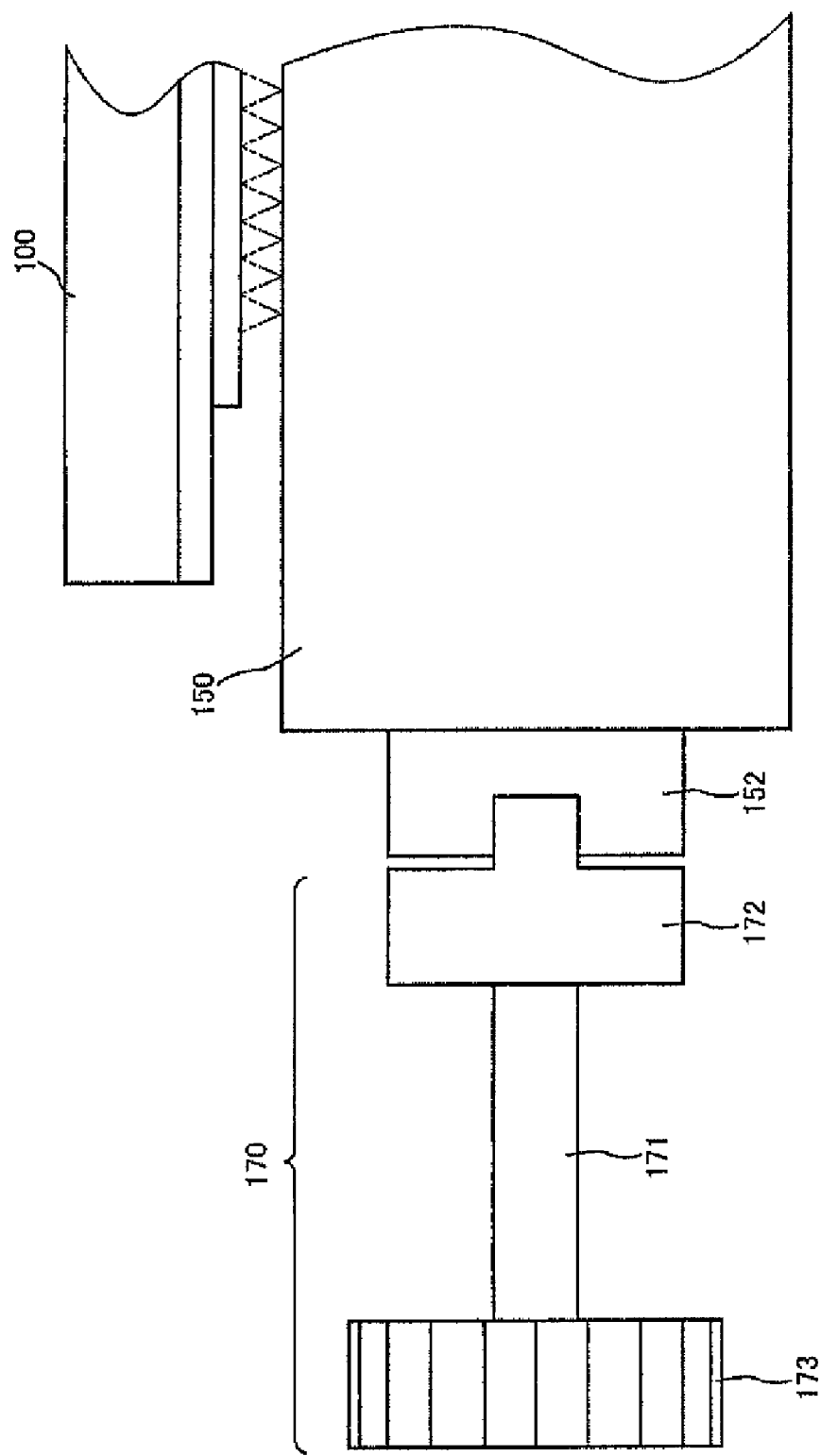
FIG. 26 is an explanatory diagram showing another embodiment of the invention.

Another embodiment of the invention will hereinafter be explained. FIG. 26 is a diagram selectively showing the region focusing on the exposure head and the photoconductor drum of an image forming device according to the another embodiment of the invention, which is a diagram showing the region viewed from a direction perpendicular to the first direction. In FIG. 26, the reference numeral 152 denotes a photoconductor drum coupling, the reference numeral 170 denotes a connection member, the reference numeral 171 denotes a second rotational shaft, the reference numeral 172 denotes a connection member coupling, the reference numeral 173 denotes a gear.

In the present embodiment, one end section of the photoconductor drum 150 is provided with the photoconductor drum coupling 152, and it is arranged that the connection member coupling 172 of the connection member 170 is engaged with the photoconductor drum coupling 152. The connection member 170 has a structure in which the gear 173 is provided to one end section of the second rotational shaft 171, and the connection member coupling 172 is provided to the other end section thereof, and arranged that the rotational drive force from a drive device, not shown, is transmitted to the photoconductor drum 150 via the gear 173. Also in such a case in which the photoconductor drum 150 is driven via the connection member 170, by adopting the configuration of satisfying the following relationship between the gear pitch G of the gear 173 and the distance Da between the imaging optical system lines 106, it becomes possible to make the influence of the banding on the image to be formed less noticeable.

$$Da > (½) \times G$$

Figure 27:
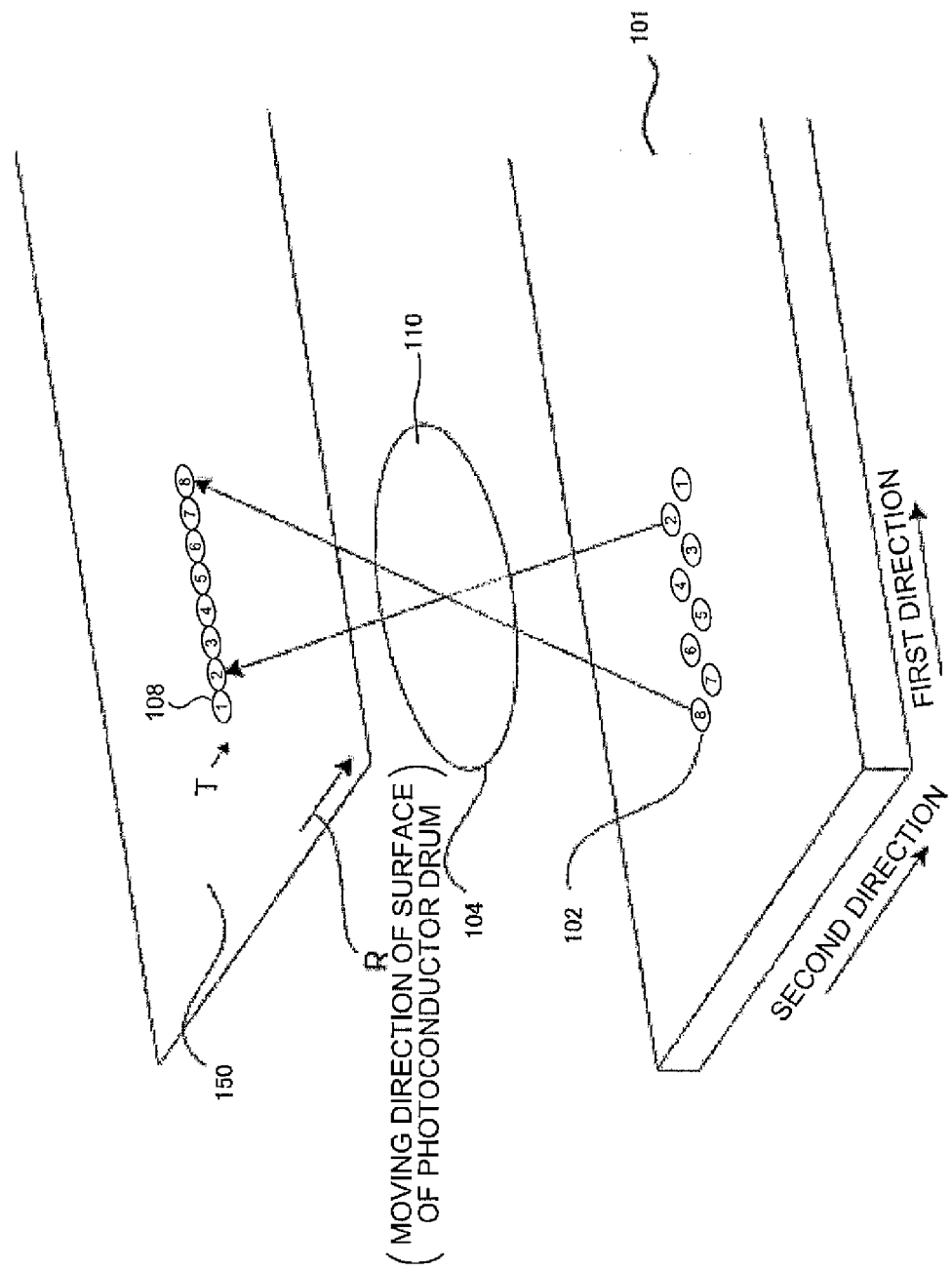
FIG. 27 is a diagram for explaining the exposure by an imaging optical system having negative optical magnification.

Then, the imaging optical system having a negative optical magnification will hereinafter be explained. In the present embodiment, the microlens array (MLA) can be used as the imaging optical system 104. The microlens array (MLA) is an imaging optical system having the negative optical magnification. FIG. 27 is a diagram for explaining the exposure by the imaging optical system having negative optical magnification.

In the exposure head 100 shown in FIG. 27, there is adopted a configuration in which two sets of light emitting elements each including four light emitting elements 102 are arranged so as to be shifted in the first and second directions from each other to constitute one light emitting element group, and one imaging lens 110 is provided correspondingly to the light emitting element group. Here, assuming that the light emitting elements are assigned with the numbers of 1 through 8, respectively, as shown in the drawing, the light emitting elements with the odd numbers and the light emitting elements with the even numbers are arranged alternately.

The imaging optical system having the negative optical magnification and used in the present embodiment is for forming an inverted image as shown in the drawing, assuming that the surface of the photoconductor drum 150 is moving along the direction of R in the drawing, in order for drawing a linear latent image in the first direction, the light emitting elements with the odd numbers are first made emit light with certain timing to form the imaging spots with the odd numbers on the surface of the photoconductor drum 150. Then, after a predetermined amount of movement of the surface of the photoconductor drum 150, the light emitting elements with the even numbers are subsequently made emit light to form the imaging spots with the even numbers on the surface of the photoconductor drum 150.

The line head, and the image forming device and the image forming method using the line head according to the invention are hereinabove explained based on the embodiments. However, the invention is not limited to such embodiments, but various modifications are possible.

What is claimed is:

1. An image forming device comprising:
   a photoconductor drum having a rotational shaft in a first direction; and
   an exposure head having
      a plurality of imaging optical systems disposed in the first direction and a second direction and each having a negative optical magnification, and
      a light emitting element substrate on which a plurality of light emitting elements are disposed, the plurality of light emitting elements emitting light beams imaged on the photoconductor drum by one of the imaging optical systems;
   a drive section that drives the photoconductor drum; and
   a gear having a pitch G, and for transmitting driving force from the drive section to the photoconductor drum, wherein
   the light beams are imaged by the imaging optical systems disposed in the second direction on the photoconductive drum at positions different from each other in the second direction,
   the imaging optical systems are disposed linearly in the first direction to form a plurality of imaging optical system lines, and
   the pitch G has a following relationship with a width Da between the plurality of imaging optical system lines: $Da > (½) \times G$.

2. The image forming device according to claim 1, wherein the imaging optical systems disposed in the second direction image the light beams from the light emitting elements on the photoconductor drum at positions different from each other in the first direction.

3. The image forming device according to claim 1, wherein the gear is disposed to the rotational shaft of the photoconductor drum.

4. The image forming device according to claim 1, wherein the photoconductor drum has a flange, and the gear is fixed to the flange.

5. The image forming device according to claim 1, further comprising:
   a connection section that connects the drive section and the photoconductor drum, and has a second rotational shaft, wherein the gear is disposed to the second rotational shaft.

6. The image forming device according to claim 1, further comprising:
   a control section that makes light emitting timing of the light emitting elements different between the imaging optical system lines, thereby forming one of a linear and a substantially linear latent image in the first direction of the photoconductor drum.

7. The image forming device according to claim 1, wherein the imaging optical system is composed mainly of two or more of lenses.

8. The image forming device according to claim 1, wherein the light emitting element is formed of an organic EL light emitting element.

* * * * *